US012141927B2

(12) United States Patent
Pahud et al.

(10) Patent No.: US 12,141,927 B2
(45) Date of Patent: Nov. 12, 2024

(54) PRESENTING AUGMENTED REALITY DISPLAY DATA IN PHYSICAL PRESENTATION ENVIRONMENTS

(71) Applicant: MICROSOFT TECHNOLOGY LICENSING, LLC, Redmond, WA (US)

(72) Inventors: Michel Pahud, Kirkland, WA (US); Nathalie Riche, Issaquah, WA (US); Eyal Ofek, Redmond, WA (US); Christophe Hurter, Toulouse (FR); Steven Mark Drucker, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1310 days.

(21) Appl. No.: 15/640,339

(22) Filed: Jun. 30, 2017

(65) Prior Publication Data

US 2019/0005724 A1    Jan. 3, 2019

(51) Int. Cl.
 *G06T 19/00* (2011.01)
 *G06F 3/01* (2006.01)
 (Continued)

(52) U.S. Cl.
 CPC ............. *G06T 19/006* (2013.01); *G06T 7/70* (2017.01); *G06F 3/013* (2013.01); *G06F 3/016* (2013.01);
 (Continued)

(58) Field of Classification Search
 CPC .......... G06F 3/011; G06F 3/013; G06F 3/016; G06F 3/017; G06T 19/006; G06T 3/20;
 (Continued)

(56) References Cited

U.S. PATENT DOCUMENTS 8,140,989 B2   3/2012   Cohen et al.
8,559,676 B2   10/2013  Hildreth
(Continued)

FOREIGN PATENT DOCUMENTS

EP    2887322 A1    6/2015

OTHER PUBLICATIONS

Citi, HoloLens Holographic Workstation; Youtube; Jun. 14, 2016.*
(Continued)

*Primary Examiner* — Ming Wu
(74) *Attorney, Agent, or Firm* — Shook, Hardy & Bacon L.L.P.

(57) ABSTRACT

Methods and systems for rendering augmented reality display data to locations of a physical presentation environment based on a presentation configuration are provided. A physical presentation environment configuration may be accessed that includes locations of a physical presentation environment for mapping augmented reality display data. The augmented reality display data may include a plurality of augmented reality objects that are rendered for display. Presentation attributes of the augmented reality display data may be used in conjunction with the presentation configuration for mapping and rendering the augmented reality display data. The rendered augmented reality display data may be dynamically interactive, and may be generated based on previous presentation configurations, mapping preferences, mapping limitations, and/or other factors.

20 Claims, 18 Drawing Sheets

(51) Int. Cl.
*G06T 3/20* (2006.01)
*G06T 3/60* (2024.01)
*G06T 7/70* (2017.01)

(52) U.S. Cl.
CPC ............... *G06F 3/017* (2013.01); *G06T 3/20* (2013.01); *G06T 3/60* (2013.01)

(58) Field of Classification Search
CPC ... G06T 3/60; G06T 7/70; G06T 11/60; G06T 15/00; G06T 2207/10016; G06T 2207/10028; G06T 2207/20076; G06T 2207/30244; G06T 2210/61; G06T 7/254; G06T 7/77
See application file for complete search history.

(56) References Cited

U.S. PATENT DOCUMENTS

| | | | |
|---|---|---|---|
| 9,007,364 | B2 | 4/2015 | Bailey |
| 9,132,342 | B2 | 9/2015 | Balachandreswaran et al. |
| 2012/0210255 | A1* | 8/2012 | Ooi ................. G06T 19/006 715/762 |
| 2013/0130813 | A1* | 5/2013 | Ackley ............. G06T 19/006 472/61 |
| 2013/0141419 | A1* | 6/2013 | Mount .............. G09G 3/003 345/419 |
| 2013/0342564 | A1 | 12/2013 | Kinnebrew et al. |
| 2014/0267228 | A1 | 9/2014 | Ofek et al. |
| 2015/0029180 | A1 | 1/2015 | Komatsu |
| 2015/0187108 | A1 | 7/2015 | Mullins |
| 2015/0268717 | A1 | 9/2015 | Schlumberger et al. |
| 2015/0356774 | A1 | 12/2015 | Gal et al. |
| 2016/0133057 | A1 | 5/2016 | Kaino et al. |
| 2016/0148433 | A1 | 5/2016 | Petrovskaya et al. |
| 2016/0263477 | A1* | 9/2016 | Ladd .................. A63F 13/212 |
| 2017/0178406 | A1* | 6/2017 | Anderson ............ G06T 19/006 |

OTHER PUBLICATIONS

Microsoft HoloLens: Spatial Mapping; Youtube; Feb. 29, 2016.*
HoloLens | Holo Lens Studio Demo | Windows 10 | Microsoft HoloLens; Youtube; Jan. 21, 2015.*
Citi HoloLens Holographic Workstation; Youtube; Jun. 14, 2016 ; https://www.youtube.com/watch?v=0NogltmewmQ (Year: 2016).*
US 2012/0210255 A1) in view of Citi (NPL: Citi HoloLens Holographic Workstation; Youtube; Jun. 14, 2016 ; https://www.youtube.com/watch?v=0NogltmewmQ (Year: 2016).*
Elsayed, et al., "Using Augmented Reality to Support Situated Analytics", In Journal of IEEE Virtual Reality Conference, Mar. 23, 2015, pp. 175-176.
Wojciechowski, et al., "Building Virtual and Augmented Reality museum exhibitions", In Proceedings of the ninth International conference on 3D Web technology, Apr. 5, 2004, pp. 135-144.
Rekimoto, et al., "Augmented surfaces: a spatially continuous work space for hybrid computing environments", In Proceedings of the SIGCHI conference on Human Factors in Computing Systems, May 15, 1999, pp. 378-385.
Olshannikova, et al., "Visualizing Big Data with augmented and virtual reality: challenges and research agenda", In Journal of Big Data, vol. 2, Issue 22, Oct. 2015, pp. 1-27.
"International Search Report and Written Opinion Issued in PCT Application No. PCT/US2018/034511", Mailed Date: Aug. 9, 2018, 15 Pages.

* cited by examiner

PRESENTING AUGMENTED REALITY DISPLAY DATA IN PHYSICAL PRESENTATION ENVIRONMENTS

BACKGROUND

Augmented reality is a technology that superimposes computer-generated objects onto a person's view of a real-world environment to provide a user display that integrates real world objects and computer-generated objects. Accordingly, augmented reality devices may provide direct or indirect views of a real-world environment, while simultaneously displaying augmented reality display objects as digital projections along with the direct or indirect views of the real-world environment. As a result, there are many ways that augmented reality display objects can be rendered for display with real-world environments.

SUMMARY

In brief, and at a high level, the technology of this disclosure relates to the mapping and rendering of augmented reality display data. Augmented reality display data is used to collectively refer to augmented reality objects and other holographic content defined based on the augmented reality display data for presentation in a physical presentation environment. In particular, a physical presentation environment configuration may be accessed to determine locations of a physical presentation environment that may be suitable for mapping a selection of augmented reality display data. A presentation configuration may be generated based on the physical presentation environment configuration and based on presentation attributes of the augmented reality display data to be mapped and rendered. The presentation attributes may include display features (e.g., dimensions, content, orientation, scaling limitations, dynamic interactivity, etc.) of the augmented reality display data. The presentation configuration may be used for mapping the augmented reality display data to the locations of the physical presentation environment. The augmented reality display data may then be rendered for display based on the generated presentation configuration, allowing a uniquely configured presentation of the augmented reality display data to be provided for a particular physical presentation environment.

The locations for mapping the augmented reality display data (hereinafter used interchangeably as "augmented reality objects" or "objects") may be determined by performing a location recognition operation on a physical presentation environment configuration that is accessed. Exemplary locations for mapping augmented reality objects might include planar surfaces, physical objects, and/or other locations in a physical presentation environment. Avoidance areas where mapping augmented reality display data should be limited or prevented may also be determined (e.g., areas where it is preferable to limit the number of augmented reality objects rendered due to visibility, accessibility, predicted interference, user position, etc.).

The presentation attributes of the augmented reality display objects may include features that can be used to determine how the augmented reality display data can be mapped to the locations of the physical presentation environment. For example, such features may include the dimensions, orientations, dynamic interactivity, content, arrangement of content, and/or other characteristics, features, and/or qualities that can be used to determine how the augmented reality display data can be mapped, arranged, and/or oriented with respect to the locations. It may be possible to generate multiple different presentation configurations for a particular combination of augmented reality display data and locations, and as a result, a user may have multiple options for viewing augmented reality objects in a particular environment.

The features of the presentation attributes may be used to guide how augmented reality objects are mapped to certain locations in a physical presentation environment. For example, an augmented reality object having flat display characteristics (e.g., a 2D chart, timeline, image, spreadsheet, etc.) may be mapped to a location in the physical presentation environment that has planar characteristics and a mapping area sufficient to accommodate the dimensions of the augmented reality object (e.g., based on the size and/or scaling restrictions of the augmented reality object). As another example, an augmented reality object, such as one having three dimensional (3D) characteristics, and/or one providing dynamic interactivity, may be mapped to an object in the physical presentation environment (e.g., a 3D object such as a table, chair, cup, pen, etc.) or to a fixed location relative to the user (e.g., within a user's reach and field of view).

Augmented reality objects may also be mapped based on received mapping preferences and/or mapping limitations. The preferences and limitations may be received for a specific physical presentation environment and selection of augmented reality display data, or may be determined from previous mapping and rendering of augmented reality display data (e.g., a mapping "history" for a user). For example, certain augmented reality objects may be mapped to certain locations based on a mapping preference indicated by a user, and certain objects may be mapped only to certain locations based on a mapping limitation received from the user. Exemplary mapping preferences and mapping limitations may include a number of objects to be mapped and a selection of objects to be mapped, the orientation of the objects, the assigned location of the objects, and/or locations where mapping of the objects should be restricted, etc. The mapping preferences and limitations may be used to generate a presentation configuration.

A dynamically interactive augmented reality object may be modifiable based on dynamic interaction (e.g., user interaction or input). The dynamic interaction may modify a presentation configuration, changing how a selection of augmented reality objects is mapped and rendered. For example, a dynamic interaction may facilitate a change in the locations of rendered augmented reality objects. Alternatively, dynamic interaction may modify the dynamically interactive augmented reality object, itself (e.g., by changing the orientation of the object).

A presentation configuration for mapping augmented reality display data may be generated and/or modified based on one or more previously generated presentation configurations for the same physical presentation environment or for a different physical presentation environment. In this sense, a mapping characteristic, preference, and/or limitation of one or more previously generated presentation configurations may be utilized to generate a new presentation configuration. For example, a preference for charts and graphs to be rendered to vertical planar surfaces (e.g., walls) may be maintained to the extent possible for a presentation configuration generated for a new physical presentation environment. In this respect, a "history" may be used to generate a presentation configuration that is more specifically tailored to a user's needs and/or preferences. Additionally, in certain embodiments, generating a presentation configuration based on a previously generated presentation configuration may not require any mapping characteristics to be maintained, but merely instead reference aspects of the previously generated presentation configuration.

This summary is provided to introduce a selection of concepts in a simplified form that are further described in the detailed description section below. This summary is not intended to identify key or essential features of the claimed subject matter, nor is it intended to be used in isolation as an aid in determining the scope of the claimed subject matter.

BRIEF DESCRIPTION OF THE DRAWINGS

The present technology is described in detail below with reference to the attached drawing figures, wherein.

DETAILED DESCRIPTION

Figure 1:
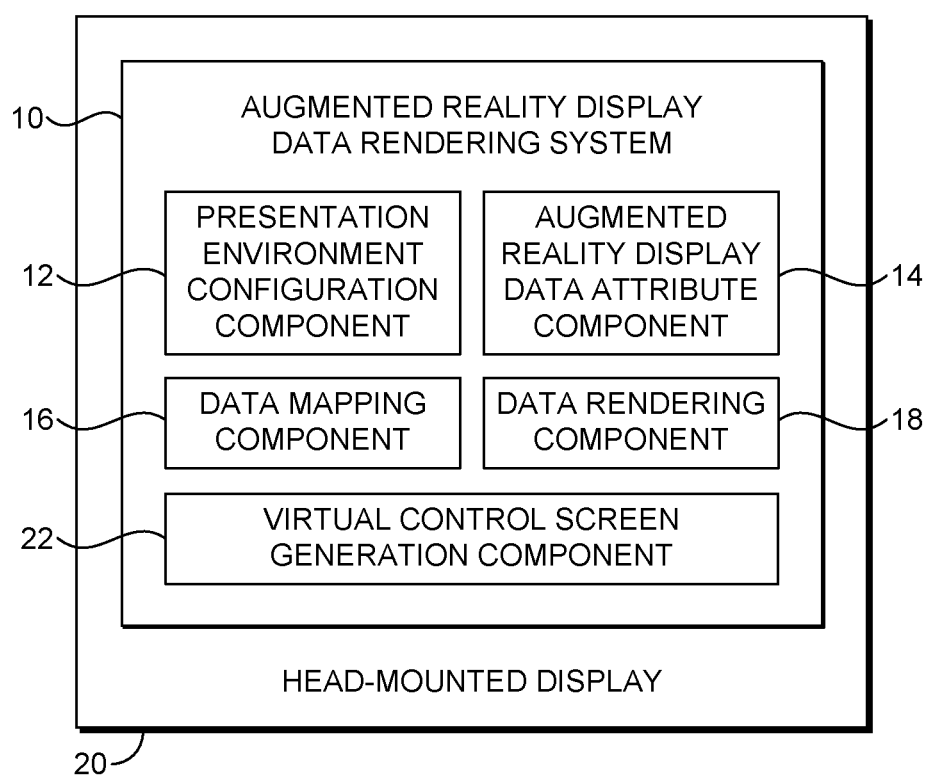
FIG. 1 depicts an exemplary system for generating a presentation configuration for mapping and rendering augmented reality display data to locations of a physical presentation environment, in accordance with an embodiment of the present technology.

Modern technology has led to the development of augmented reality devices. Augmented reality devices provide direct or indirect views of a real world environment along with digitally projected augmented reality objects. This provides a display that integrates real world objects and computer-generated objects. As a result, augmented reality devices can operate as scene-aware devices that have an understanding of a real world environment defined as an augmented reality environment (i.e., virtual environment) supported by the augmented reality device.

An augmented reality device can support the presentation of augmented reality display data, which may include one or more augmented reality objects. Augmented reality objects are virtualized entities (e.g., holographic content or mixed reality content) that may be rendered based on the representations of the real world environment captured by the augmented reality device. The environment to which the augmented reality objects may be rendered for presentation, which may be referred to as a "physical presentation environment," may be established based on different techniques that provide information about the physical presentation environment to the augmented reality device. For example, an environment may be scanned in real-time and a mesh representation of the environment may be dynamically generated to provide the augmented reality device with information about the environment. Augmented reality devices can support augmented reality or mixed-reality experiences. A user experience might include navigating real world environments based on augmented reality objects or viewing augmented reality objects in combination with a real world environment. Augmented reality objects can include different types of computer sensory input (e.g., sound, video, graphics, GPS data, etc.) combined with the real world. For example, a hologram catalogue or virtual images of 3D objects can be placed and scaled for projection with views of the real world. Augmented reality objects may be provided in a variety of different implementations (e.g., video games, entertainment, productivity tools, data or information mining and interaction, etc.), as well as entities that have functionality based on preconfigured instructions and/or input from a user of an augmented reality device.

However, displaying augmented reality objects presents challenges due to the numerous ways in which augmented reality objects can be mapped and rendered. For example, different physical presentation environments may be suitable for different presentations of augmented reality objects, depending on the characteristics of the physical presentation environments and the presentation attributes of the augmented reality objects. Furthermore, a user may wish to maintain certain mapping and rendering characteristics between different physical presentation environments for consistency. A user may also wish to have greater control of how augmented reality objects are mapped and rendered and/or be able to configure the presentation of augmented reality objects based on his or her preferences or needs. In this regard, mapping and rendering augmented reality display data to achieve such objectives is desired.

Accordingly, the technology of this disclosure relates to mapping and rendering augmented reality display data to physical presentation environments based on presentation configurations that are generated to allow the augmented reality display data to be presented in an intuitive and/or configurable manner. As a result, any physical presentation environment can become a customized augmented reality space. This may be of particular use for cognitively demanding activities, such as data analysis and exploration, or other activities that require multiple views and/or dataset presentations.

Embodiments of the technology include methods and systems for mapping and rendering augmented reality display data. In one embodiment, a physical presentation environment configuration is accessed that provides locations of a physical presentation environment (e.g., locations of a physical space) useable for mapping and rendering augmented reality display data. The augmented reality display data may include a plurality of augmented reality objects. Presentation attributes that include features of the augmented reality display data may be used to determine how the augmented reality objects can be mapped to the locations of the physical presentation environment. A presentation configuration may be generated based on the physical presentation environment configuration and the presentation attributes. The presentation configuration includes a mapping of one or more of the augmented reality objects to one or more of the locations of the physical presentation environment. The augmented reality objects may be rendered to the physical presentation environment based on the presentation configuration.

Referring to FIG. 1, an augmented reality display data rendering system 10 integrated for use with a head-mounted display 20 is provided, in accordance with an embodiment of the present technology. The system 10 includes a presentation environment configuration component 12, which may be used to access a physical presentation environment configuration that includes locations of a physical presentation environment for mapping augmented reality display data.

The system 10 further includes an augmented reality display data attribute component 14, which may be used to determine presentation attributes of the augmented reality display data being mapped and rendered. The presentation attributes may include features of the augmented reality display data that are used to determine how the augmented reality display data can be mapped to the locations of the physical presentation environment. The augmented reality display data may include a plurality of augmented reality objects (e.g., virtual objects, images, motion graphics, data renderings, etc.) that are to be rendered for display.

The system 10 further includes a data mapping component 16 configured to generate a presentation configuration for mapping the augmented reality display data based on the physical presentation environment (e.g., the locations available for mapping augmented reality objects) and based on the presentation attributes (e.g., the content, dimensions, 2D or 3D characteristics, dynamic interactivity, etc.) of the augmented reality display data. The system 10 further comprises a data rendering component 18 that is useable for rendering the augmented reality display data based on the presentation configuration.

The system 10 of FIG. 1 may further include, and/or may be further implemented for use with, or integrated into components of, a head-mounted display 20 useable for displaying the mapped and rendered augmented reality display data. The head-mounted display 20 may include a physical environment scanning component (e.g., an imaging device or camera) configured to generate a scanned image of the physical presentation environment and perform a location recognition operation on the scanned image to determine the locations of the physical presentation environment for mapping the augmented reality display data.

A system as used herein refers to any device, process, service, or combination thereof. A system may be implemented using components such as hardware, software, firmware, a special-purpose device, or any combination thereof. A system may be integrated into a single device or it may be distributed over multiple devices. The various components of a system may be co-located or distributed. The system may be formed from other systems and components thereof. The components facilitate mapping and rendering augmented reality display data to physical presentation environments based on presentation configurations.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

A location recognition operation may determine the locations of the physical presentation environment based on one or more location mapping factors. For example, location mapping factors may include (1) a location of one or more planar surfaces in the physical presentation environment (e.g., walls, floors, and windows, including those with a determined sufficient surface area, etc.), (2) a location of one or more objects in the physical presentation environment, (e.g., chairs, tables, boxes, cups, pens, computers, shelves, etc.), (3) a location of one or more avoidance areas in the physical presentation environment where the mapping of augmented reality objects should be restricted or avoided (e.g., locations with high noise backgrounds, locations with excessive light or glare, doorways, etc.), and/or (4) a location of a user in the physical presentation environment (e.g., to determine which locations will be visible). It is contemplated that at a macro-level, a location recognition component (e.g., GPS, altimeter, Wi-Fi signal) can help identify historical relevant location compared to current locations in order to make location recognition actions.

The augmented reality display data attribute component 14 may be configured to determine features of the augmented reality display data. For example, determining features of the augmented reality display data can be based on a retrieved data property file that identifies the features and/or based on a retrieved layout property of the features (e.g., a scale, pixilation, dimension, 2D or 3D characteristics, etc.). The data mapping component 16 may further be configured to generate the presentation configuration based on a previously generated presentation configuration for the physical presentation environment (i.e., for the same physical space) and/or based on a previously generated presentation configuration for another physical presentation environment (i.e., a different physical space).

In this sense, the generation of a presentation configuration may take into account a "history" of the mapping and rendering of the augmented reality display data, so that one or more mapping characteristics and/or one or more mapping preferences and/or limitations received from a user may be maintained. For example, a user may indicate a preference for a chart to be displayed on a vertical planar surface. Upon entering a new physical space, a presentation configuration may be generated so that the augmented reality display data is mapped and rendered to at least partially maintain this indicated preference within the constraints of the available physical environment. Additionally, if a location needed to maintain the mapping preference is not available, the system 10 may indicate that placement based on the mapping preference is not possible and/or may prompt for further input on the positioning of the augmented reality object.

The system 10 further includes, as depicted in FIG. 1, a virtual control screen generation component 22 configured to generate a virtual control screen for display with the augmented reality display data mapped and rendered to the physical presentation environment. The virtual control screen may be configured to provide dynamic interactivity (e.g., by providing interactive control of the rendered augmented reality objects). The virtual control screen may include one or more dynamically interactive elements (e.g., buttons, moveable reduced-scale representations of augmented reality objects to be rendered, etc.). Haptic feedback may be used to indicate when dynamic interaction has occurred with the virtual control screen (e.g., a haptic feedback may be provided when a user presses a virtual button).

A virtual control screen may be rendered to a specific location in the physical presentation environment to facilitate dynamic interaction. For example, the virtual control screen may be rendered to an object, a surface, or to a preselected location, angle, and/or distance from a user. The virtual control screen may be used to modify the presentation configuration by receiving dynamic input that changes the content, the arrangement of content, and/or the positioning of augmented reality objects, or that changes a size, scale, and/or relative size or scale of the augmented reality objects, that adds or removes augmented reality objects, or that initiates functions (e.g., such as video playback or cycling of content). The virtual control screen may also allow dynamic interaction with the content of an augmented reality object (e.g., allowing a user to scroll through pages of a PDF).

Figure 2A:
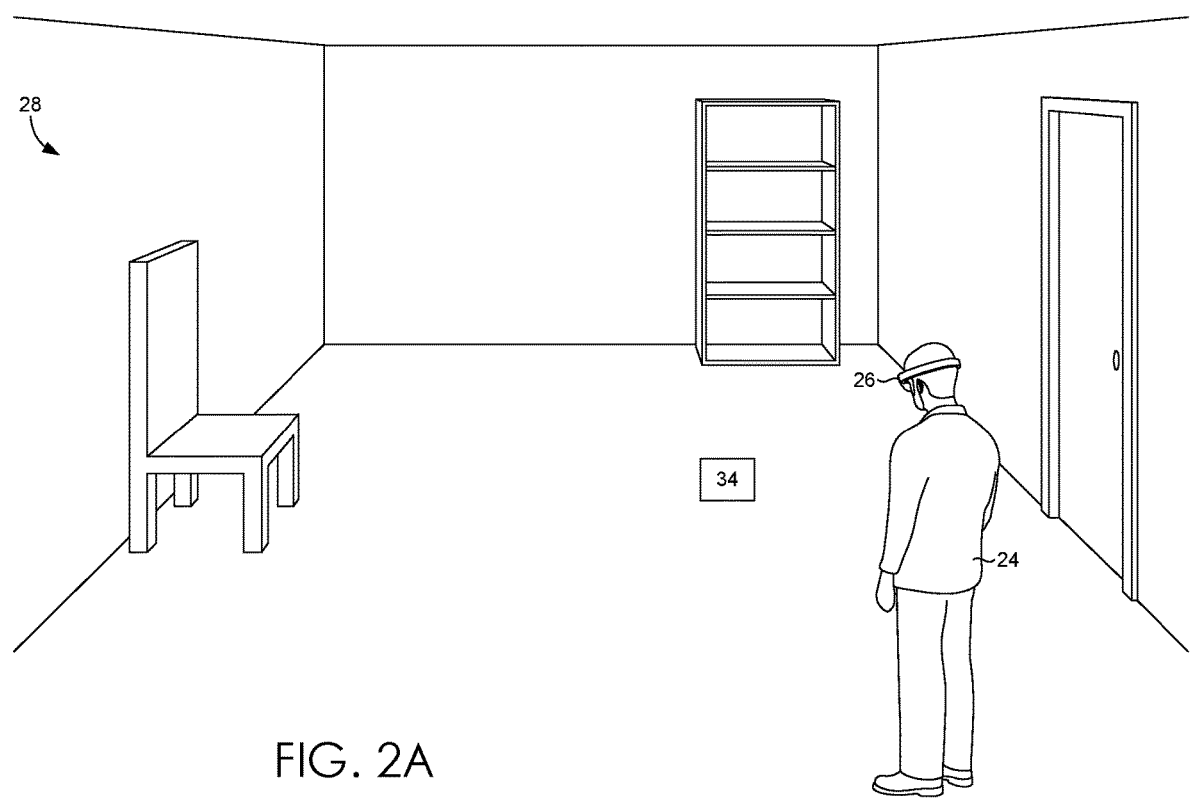
FIG. 2A depicts an exemplary physical presentation environment, in accordance with an embodiment of the present technology.

Referring to FIG. 2A, an exemplary physical presentation environment 28 having locations for mapping augmented reality display data is provided, in accordance with an embodiment of the present technology. The physical presentation environment 28 depicted in FIG. 2A is shown as a physical space (i.e., a room). A user 24 is depicted with a head-mounted display 26 that is useable for mapping and rendering augmented reality display data based on a generated presentation configuration. The head-mounted display 26 may utilize the system 10 of FIG. 1 to access a physical presentation environment configuration that includes locations of the physical presentation environment 28 useable for mapping augmented reality display data. The head-mounted display 26 may include one or more processors, computer-readable media, and/or data storage components, and may include a physical space scanning component, such as a camera, scanner, imaging-device, etc., that may be used to capture a scanned image of the physical presentation environment 28. A location recognition operation may be used to determine the locations from the scanned image.

Locations of the physical presentation environment 28 which may be suitable for rendering augmented reality display data may include planar surfaces (e.g., walls, floors, etc.) which may be used for mapping 2D augmented reality objects (e.g., a chart, a timeline, a graph, a spreadsheet, etc.) and/or physical objects (e.g., chairs, tables, computers, etc.) which may be used for mapping 3D augmented reality objects. Additionally, a location at a fixed position, distance, and/or orientation relative to the user 24, such as the location 34 shown in FIG. 2A, may be provided for certain augmented reality objects, such as those providing dynamic interactivity (e.g., a virtual control screen).

Figure 2B:
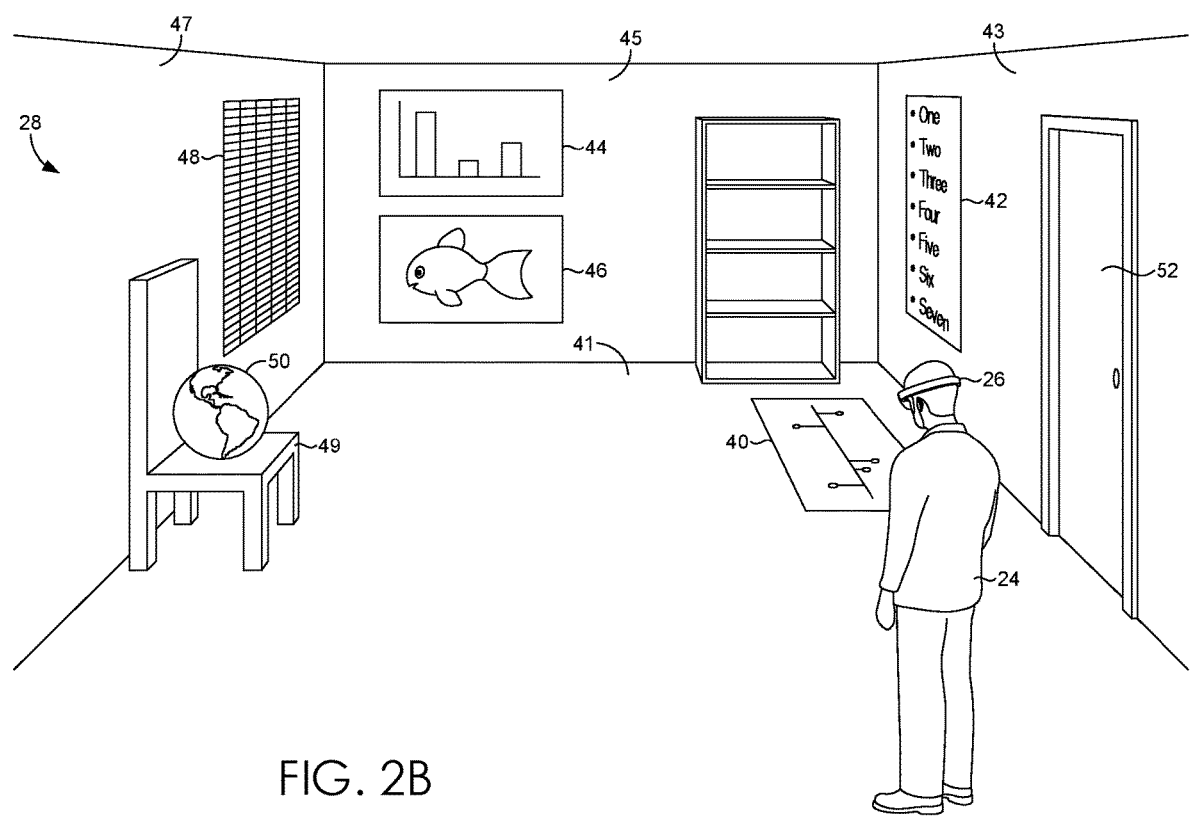
FIG. 2B depicts the physical presentation environment of FIG. 2A with augmented reality display data mapped and rendered based on a generated presentation configuration, in accordance with an embodiment of the present technology.

Referring to FIG. 2B, the physical presentation environment 28 of FIG. 2A with a plurality of augmented reality objects 40, 42, 44, 46, 48, 50 mapped and rendered for display based on a presentation configuration is provided, in accordance with an embodiment of the present technology. In FIG. 2B, the presentation configuration provides a mapping of the augmented reality objects 40, 42, 44, 46, 48, 50 to locations in the physical presentation environment 28. The mapped augmented reality objects 40, 42, 44, 46, 48, 50 are then rendered for display based on the presentation configuration, as shown in FIG. 2B. The first augmented reality object 40 is a timeline. The second augmented reality object 42 is a data representation in list form. The third augmented reality object 44 is a graph which may be static or dynamic. The fourth augmented reality object 46 is an image or motion graphic (e.g., a picture or video). The fifth augmented reality object 48 is a chart (e.g., a spreadsheet). The sixth augmented reality object 50 is a 3D object (e.g., a globe or screen with multiple viewable orientations).

The exemplary rendering shown in FIG. 2B may provide an intuitive and navigable layout of the augmented reality objects 40, 42, 44, 46, 48, 50 using the presentation configuration. For example, the first augmented reality object 40 is rendered to a first horizontal planar surface 41 in the physical presentation environment 28. The second augmented reality object 42 is rendered to a first vertical planar surface 43 in the physical presentation environment 28. The third augmented reality object 44 is rendered to a second vertical planar surface 45 in the physical presentation environment 28. The fourth augmented reality object 46 is rendered to the second vertical planar surface 45 in the physical presentation environment 28 (i.e., adjacent to the third augmented reality object 44). The fifth augmented reality object 48 is rendered to a third vertical planar surface 47 in the physical presentation environment 28. The sixth augmented reality object 50 is rendered to a physical object 49 (i.e., a chair) in the physical presentation environment 28. In contrast to the first, second, third, fourth, and fifth augmented reality objects 40, 42, 44, 46, 48, the sixth augmented reality object 50 is an object that may provide dynamic interactivity (e.g., by allowing, in response to dynamic input, rotation for viewing of different data sets).

It should be noted that the augmented reality objects 40, 42, 44, 46, 48, 50 and the mapping of the same provided in FIG. 2B is exemplary. Accordingly, different objects and presentation configurations are possible and contemplated. Additionally, alternate presentation configurations may be provided based on mapping preferences, mapping limitations, the selection of augmented reality display data being rendered, available locations, changes to the physical environment, etc.

Figure 2C:
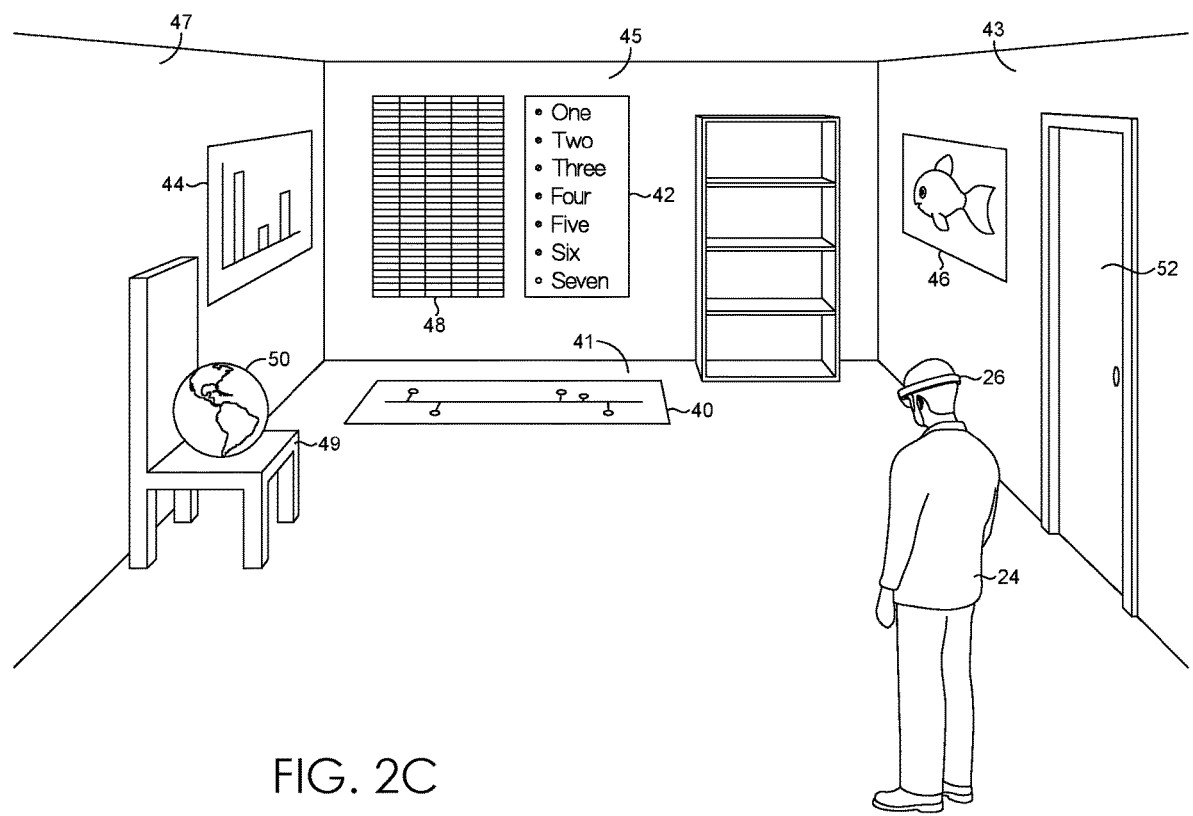
FIG. 2C depicts the physical presentation environment of FIGS. 2A-2B with the augmented reality display data mapped and rendered based on a modified presentation configuration, in accordance with an embodiment of the present technology.

Referring to FIG. 2C, the physical presentation environment 28 of FIGS. 2A-2B having augmented reality display data mapped and rendered based on an alternate presentation configuration is provided, in accordance with an embodiment of the present technology. As shown in FIG. 2C, the alternate presentation configuration provides a different visual layout of the augmented reality objects 40, 42, 44, 46, 48, 50. For example, the location of each of the first, second, third, fourth, and fifth augmented reality objects 40, 42, 44, 46, 48 has been modified. This modification may be based on a mapping preference received from the user 24 (e.g., input indicating a preferred location for mapping and rendering one or more of the augmented reality objects 40, 42, 44, 46, 48, 50) and/or a mapping limitation received from the user 24 (e.g., input indicating a restriction for mapping one or more of the augmented reality objects 40, 42, 44, 46, 48, 50).

A presentation configuration may be generated by taking into consideration locations where mapping augmented reality objects is not desirable. For example, it may be determined, automatically or based on one or more received mapping preferences and/or mapping limitations, that augmented reality objects should not be rendered to locations that have a threshold level of background noise that obscures the displayed data, or to locations with a potential for interference (e.g., from persons, moving objects, and/or other visual distractions).

For example, the physical presentation environment 28 of FIG. 2B includes a doorway 52. The presentation configuration may be generated so that the mapping and rendering of the augmented reality objects 40, 42, 44, 46, 48 to or near the doorway 52 is restricted in order to limit visual interference caused by persons opening and passing through the doorway 52. Similarly, the mapping and rendering of augmented reality objects to or near areas with a certain amount of light, glare, and/or reflection in the physical presentation environment 28 may also be limited (e.g., windows or reflective surfaces).

In FIG. 2C, the alternate presentation configuration has resulted in the first augmented reality object 40 being moved to a different area of the first horizontal planar surface 41. The first augmented reality object 40 has also been rotated to a different orientation to allow easier viewing by the user 24. This modification may have been facilitated by a user-provided mapping preference or mapping limitation, or may have been facilitated by the components of the head-mounted display 26 based on the presentation attributes, the available mapping locations, and the position of the user 24. The second and fifth augmented reality objects 42, 48 have been moved to the second vertical planar surface 45. The third augmented reality object 44 has been moved to the third vertical planar surface 47. The fourth augmented reality object 46 has been moved to the first vertical planar surface 43. The sixth augmented reality object 50 has not changed location, but in alternative scenarios, could be re-positioned and/or re-oriented as desired.

Figure 3:
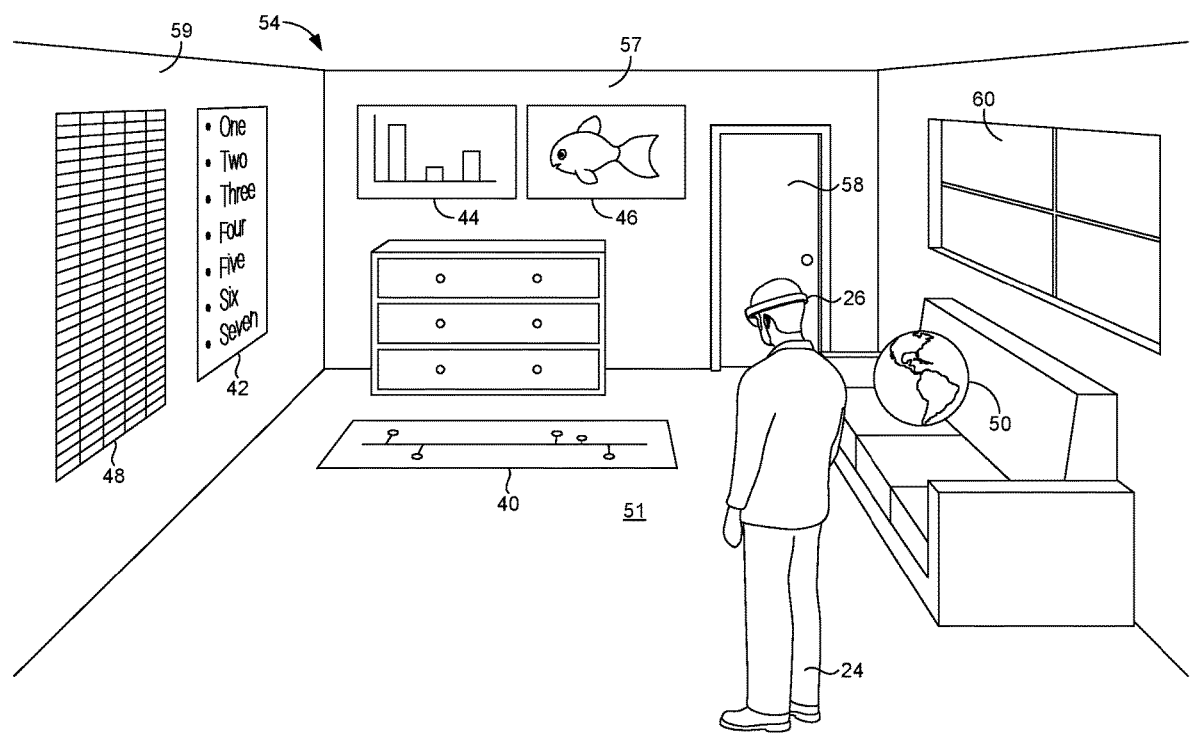
FIG. 3 depicts augmented reality display data mapped and rendered to locations of a physical presentation environment based on a previously generated presentation configuration, in accordance with an embodiment of the present technology.

Referring to FIG. 3, a physical presentation environment 54 is provided with augmented reality objects mapped based on a previously generated presentation configuration for the physical presentation environment 28 of FIGS. 2A-2C, in accordance with an embodiment of the present technology. In other words, in FIG. 3, the first, second, third, fourth, fifth, and sixth augmented reality objects 40, 42, 44, 46, 48, 50 are mapped and rendered for display in the physical presentation environment 54 so that at least one mapping characteristic of a presentation configuration used to render the augmented reality objects 40, 42, 44, 46, 48, 50 for display with the physical presentation environment 28 is maintained.

For example, as shown in FIG. 3, the first augmented reality object 40 is mapped to a horizontal planar surface 51 with a similar orientation as that shown in FIG. 2C. The third and fourth augmented reality objects 44, 46 are mapped to a vertical planar surface 57 oriented towards a center of the field of view of the user 24. The second and fifth augmented reality objects 42, 48 are mapped to a vertical planar surface 59. Furthermore, the mapping and rendering of the augmented reality objects 40, 42, 44, 46, 48, 50 to avoidance areas (e.g., the doorway 58 and the window 60) has been restricted. The sixth augmented reality object 50 is mapped and rendered to a physical object 62 (i.e., a sofa) similar to FIG. 2C. As shown in FIG. 3, mapping preferences, mapping limitations, and/or mapping histories for particular augmented reality objects, physical presentation environments, and/or users may guide the generation of a presentation configuration for mapping augmented reality objects in a new environment such that one or more mapping characteristics are at least partially maintained.

Figure 4:
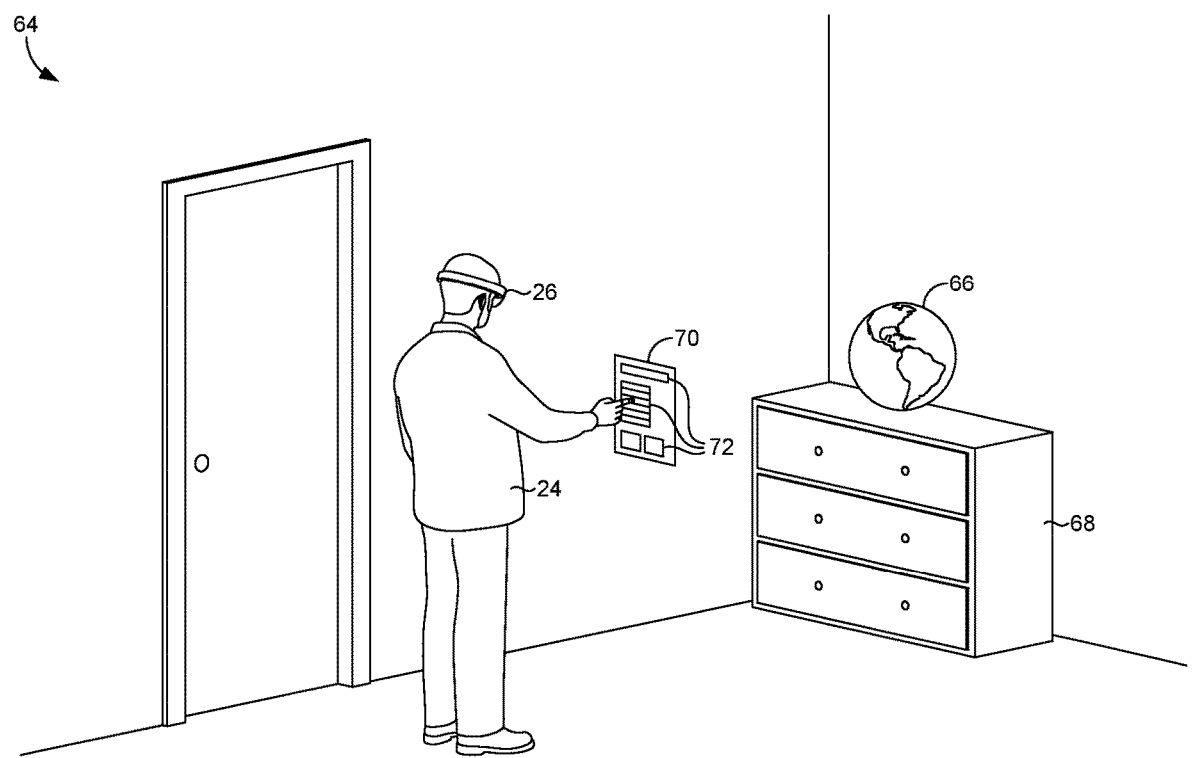
FIG. 4 depicts user interaction with a dynamically interactive augmented reality object, in accordance with an embodiment of the present technology.

Referring to FIG. 4, a user 24 interacting with a dynamically interactive augmented reality object 70 is provided, in accordance with an embodiment of the present technology. The user 24 is wearing the head-mounted display 26 which is configured to generate a presentation configuration for mapping and rendering augmented reality objects to locations in the physical presentation environment 64 in which the user 24 is located. In FIG. 4, an augmented reality object 66 is mapped and rendered to a physical object 68 (i.e., a dresser) in the physical presentation environment 64. Additionally, the dynamically interactive augmented reality object 70 is mapped and rendered to a pre-determined location relative to the user 24. In FIG. 4, the dynamically interactive augmented reality object 70 is a virtual control screen with a plurality of dynamically interactive components 72 (e.g., buttons, etc.). The virtual control screen may be generated using the virtual control screen generation component 22 of the system 10 shown in FIG. 1.

The virtual control screen may be used to control the mapping and rendering of augmented reality objects to the physical presentation environment 64. The virtual control screen may also be used to manipulate augmented reality objects that are mapped and rendered to the physical presentation environment 64, such as the augmented reality object 66, in real-time. In this sense, the virtual control screen may be used to rotate or move the augmented reality object 66, and/or may be used to modify the content of the augmented reality object 66, among other functions. The virtual control screen may also allow the user 24 to render for display additional augmented reality objects or remove augmented reality objects from display. Dynamic interaction with the virtual control screen may also trigger haptic feedback (e.g., vibration, noise, or visual indications provided to the user 24 using the head-mounted display 26 or another device). The haptic feedback may be used to indicate when the dynamic interaction has resulted in a desired action (e.g., indicating when a virtual button has been pressed). It is further contemplated that the virtual control screen could be displayed on a physical object (e.g., a wall) such that passive haptic feedback is generated based on the physical object.

Figure 5A:
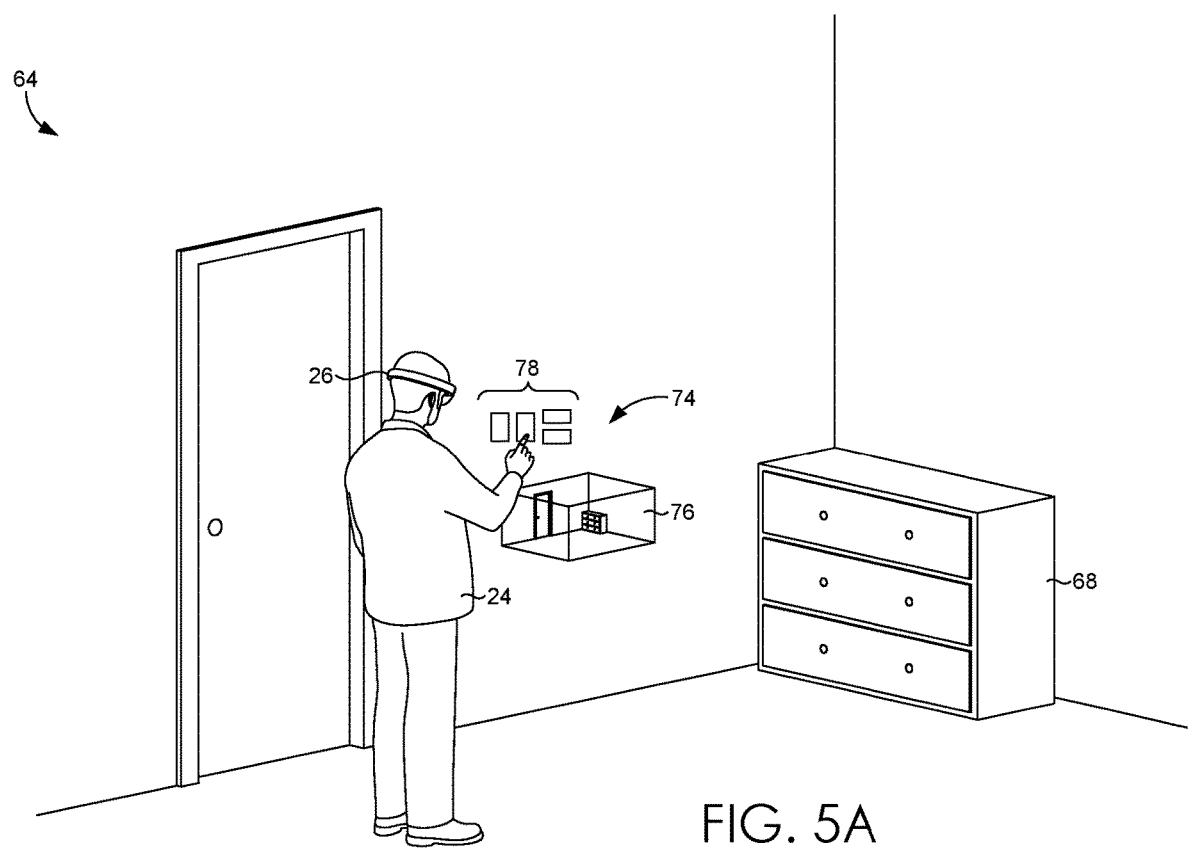
FIGS. 5A-5B depict user interaction with a dynamically interactive augmented reality object representing a scaled model of a physical presentation environment, in accordance with an embodiment of the present technology.
Figure 5B:
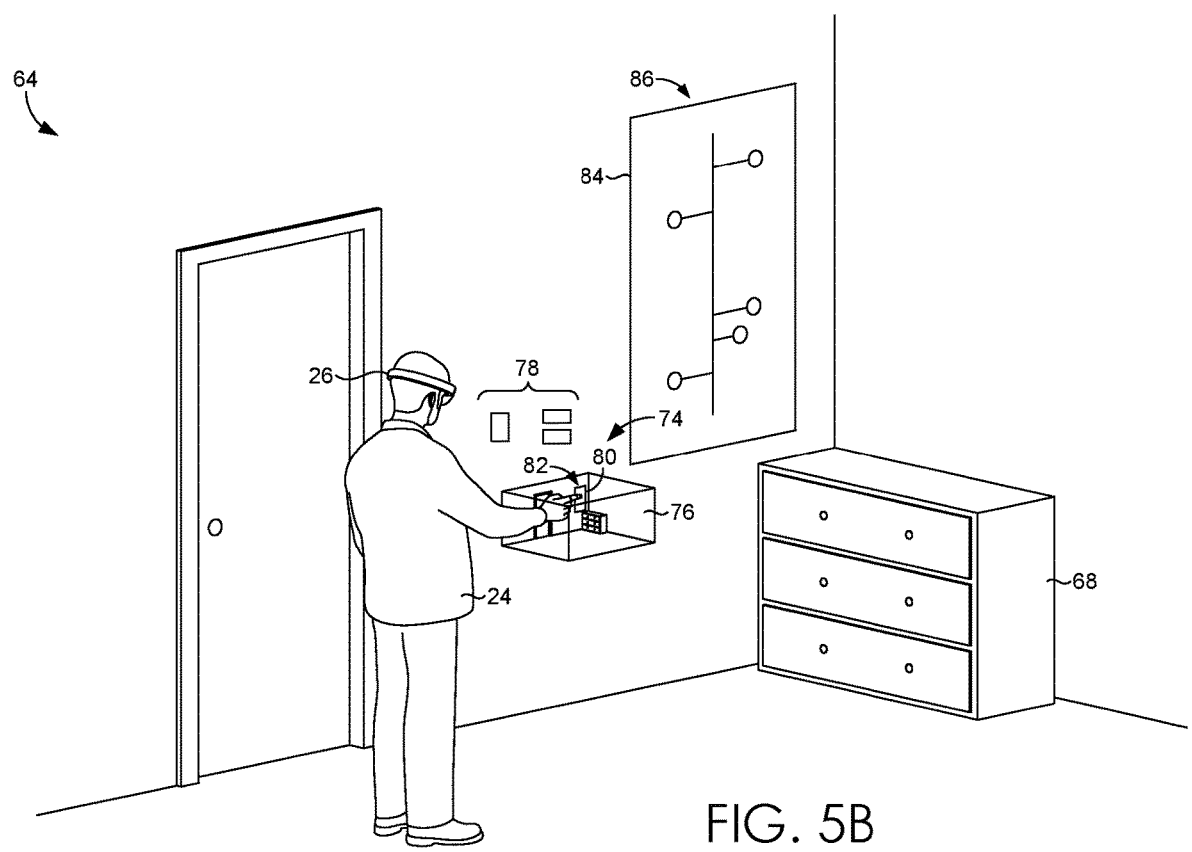

Referring to FIGS. 5A-5B, a user 24 interacting with a dynamically interactive augmented reality object 74 is provided, in accordance with an embodiment of the present technology. The dynamically interactive augmented reality object 74 is mapped and rendered for display to the user 24 as a representation of the physical presentation environment. For example, the dynamically interactive augmented reality object can specifically be a reduced scale model 76 of the physical presentation environment 64. It includes a plurality of reduced scale augmented reality objects 78 (e.g., images, graphs, charts, 2D or 3D objects, etc.) that can be placed on the reduced scale model 76 by the user 24 to control the mapping of corresponding full scale augmented reality objects to the physical presentation environment 64.

In this sense, as shown in FIG. 5B, the user 24 is able to virtually place a reduced scale augmented reality object 80 on a location 82 on the reduced scale model 76. This placement results in a corresponding full scale augmented reality object 84 being rendered to a corresponding location 86 (e.g., a vertical planar surface) in the physical presentation environment 64. As a result, the positioning, orientation, and/or arrangement of augmented reality objects rendered to the physical presentation environment 64 may be controlled by the user 24 using the reduced scale model 76. This reduced scale manipulation may also limit an amount of movement and energy expenditure required from the user 24.

Figure 6A:
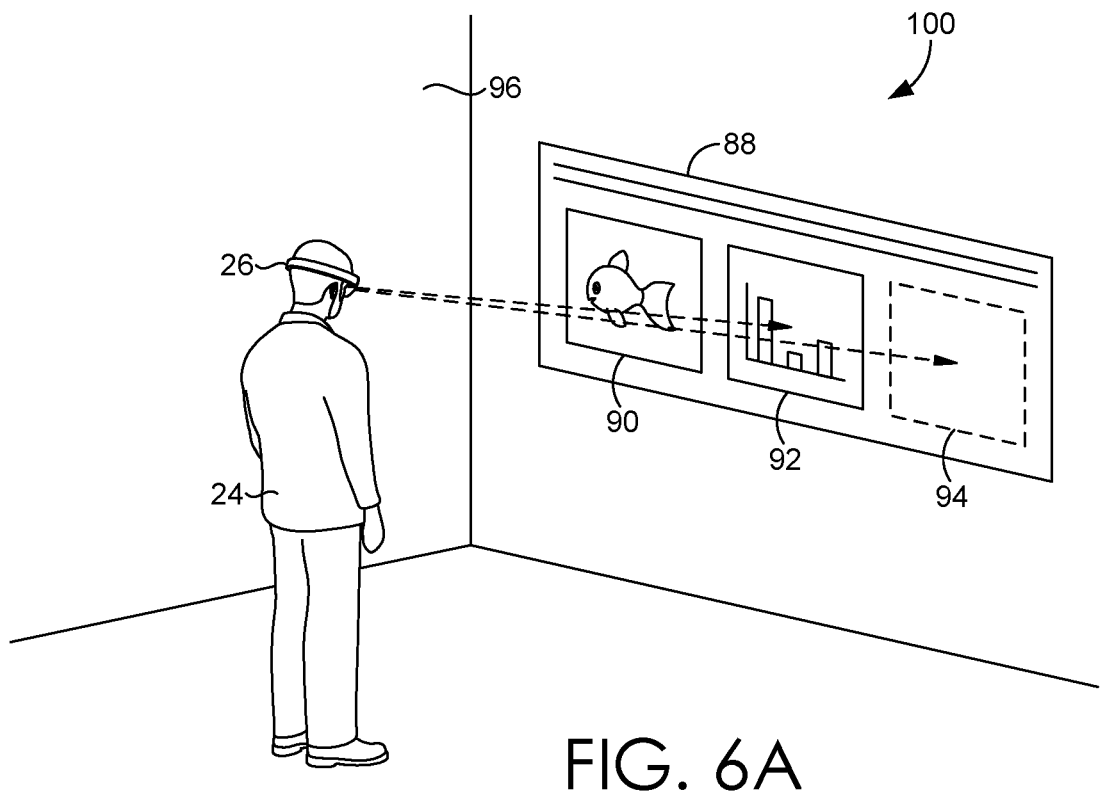
FIG. 6A depicts user interaction with a dynamically interactive augmented reality object based on visual input from the user, in accordance with an embodiment of the present technology.

Referring to FIG. 6A, a user interacting with a dynamically interactive augmented reality object 88 using visual input is provided, in accordance with an embodiment of the present technology. In FIG. 6A, the dynamically interactive augmented reality object 88 is rendered for display with the physical presentation environment 100 using the head-mounted display 26. The dynamically interactive augmented reality object 88 includes first and second interactive display elements 90, 92 (e.g., virtual images). The head-mounted display 26 is configured to allow the user 24 to look with his eyes to move the interactive display elements 90, 92 relative to each other by tracking the eye movement of the user 24. The head-mounted display 26 may include an eye-tracking device (e.g., camera) for tracking the eye movement of the user 24.

More specifically, in FIG. 6A, the user 24 moves his eyes to control the movement of the second interactive display element 92 in order to move it to a different location 94. In similar aspects, the user 24 may use eye movement to move augmented reality objects, such as the dynamically interactive augmented reality object 88 shown in FIG. 6A, to different locations in the physical presentation environment 100. For example, the dynamically interactive augmented reality object 88 could be moved to the adjacent planar surface 96 shown in FIG. 6A based on tracked eye movement from the user 24. Eye tracking for movement of augmented reality objects may be engaged based on specific user input, such as virtual touch input or voice control, and may provide haptic feedback. The use input from an addition input device to communicate an indication for dynamic interaction.

Figure 6B:
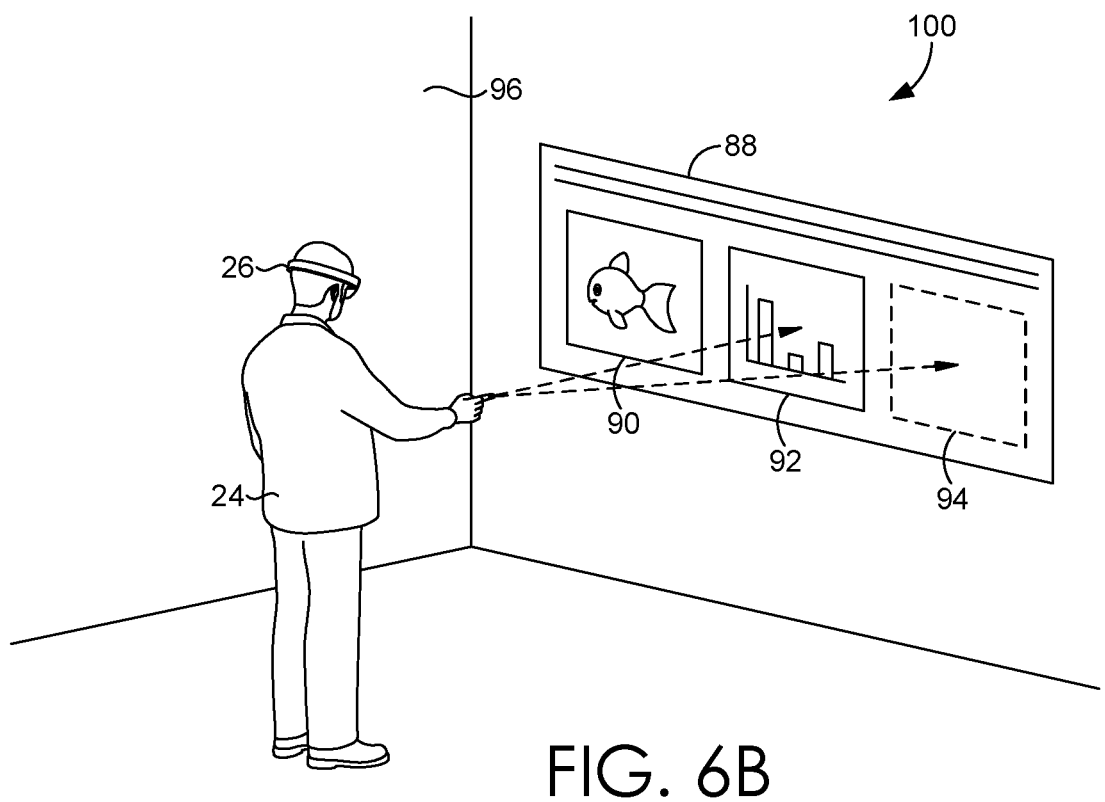
FIG. 6B depicts user interaction with a dynamically interactive augmented reality object based on movement input from the user, in accordance with an embodiment of the present technology.

Referring to FIG. 6B, user interaction with the dynamically interactive augmented reality object 88 of FIG. 6A based on movement input is provided, in accordance with an embodiment of the present technology. In FIG. 6B, once again, the dynamically interactive augmented reality object 88 is mapped and rendered to the physical presentation environment 100 for display to the user 24 using the head-mounted display 26. In contrast to FIG. 6A, the dynamic interaction that moves the second interactive display element 92 to the different location 94 is user movement (e.g., gesture—movement of an arm and/or a finger of the user 24) that is tracked.

In this sense, rather than requiring the user 24 to physically move to the dynamically interactive augmented reality object 88 to manipulate the same, the user 24 can control the dynamically interactive augmented reality object 88 with more limited physical movement. Additionally, in different aspects, the user 24 can place, move, rotate, and/or scale different augmented reality objects mapped and rendered for display using movement tracking as well. This may limit an amount of energy expended in movement of body parts and the placement and manipulation of augmented reality objects in a physical presentation environment.

Figure 7A:
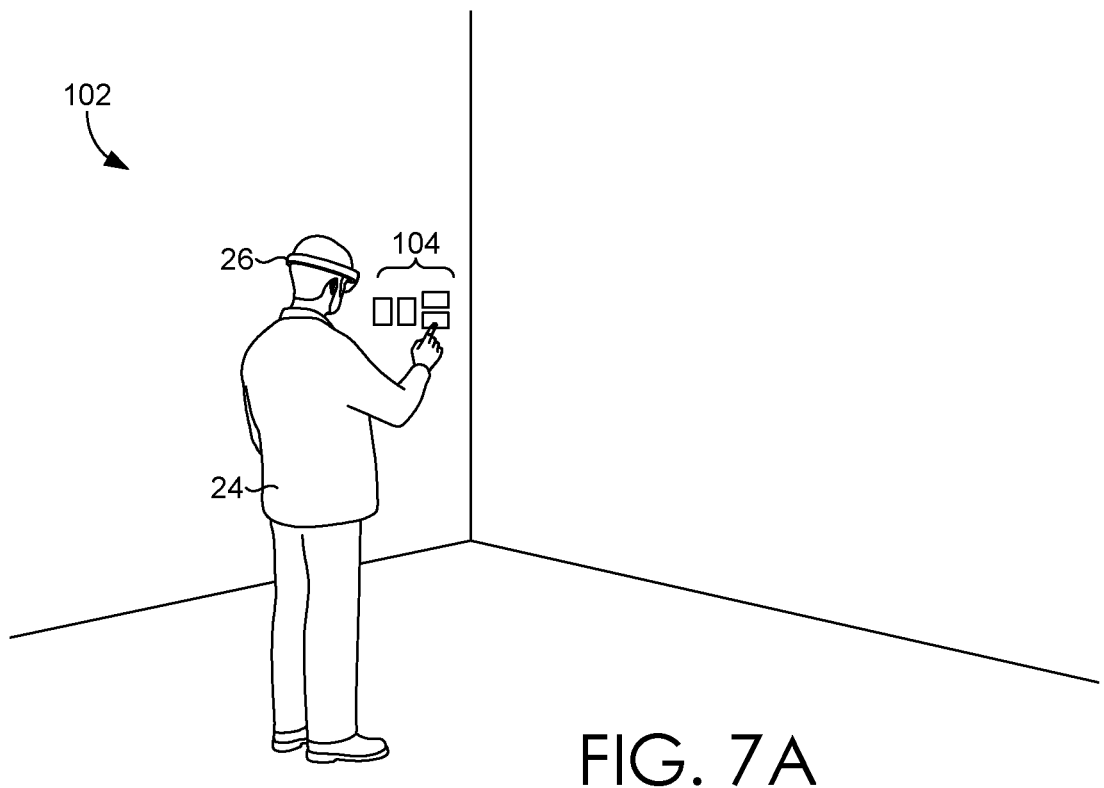
FIGS. 7A-7B depict user interaction with a dynamically interactive augmented reality object that controls the mapping of augmented reality objects to locations of the physical presentation environment, in accordance with an embodiment of the present technology.
Figure 7B:
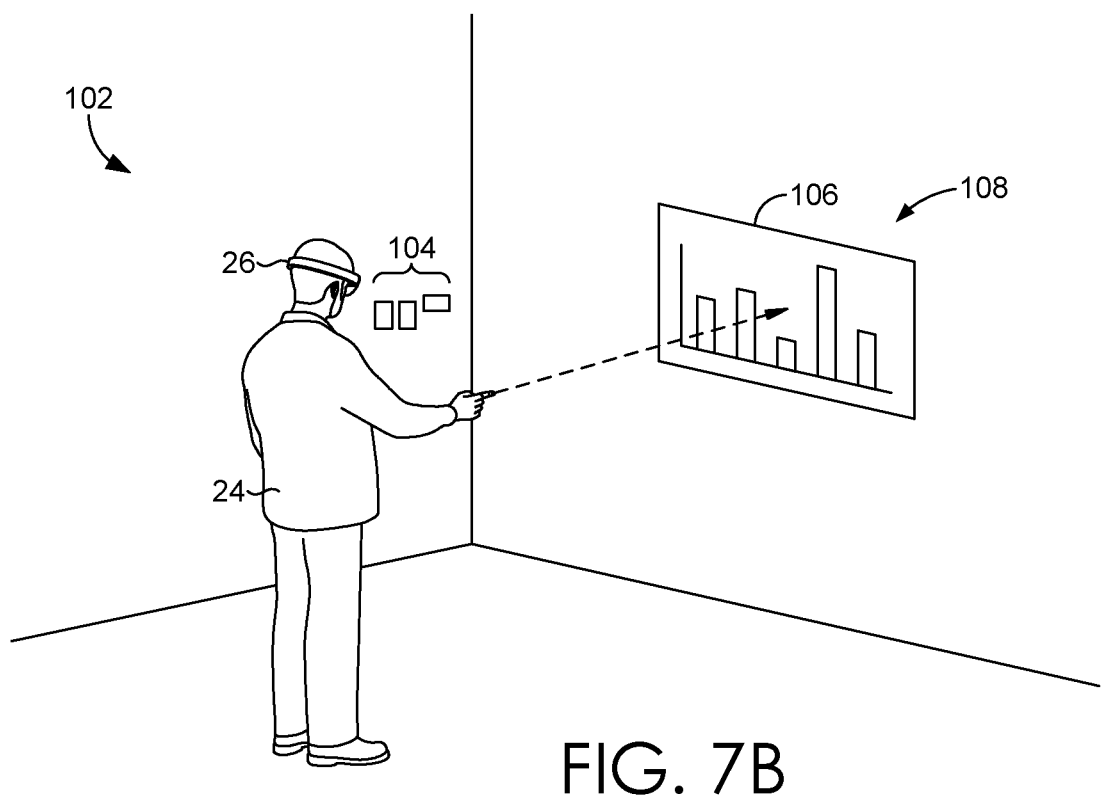

Referring to FIGS. 7A-7B, user interaction with dynamically interactive augmented reality objects to facilitate mapping and rendering the augmented reality objects to a physical presentation environment 102 is provided, in accordance with an embodiment of the present technology. In FIG. 7A, a user 24 is depicted with a plurality of reduced scale augmented reality objects 104 mapped and rendered for display using the head-mounted display 26. As shown in FIG. 7B, the user 24, through touch-based interaction with the plurality of reduced scale augmented reality objects 104, is able to place the augmented reality objects 104 as full-scale augmented reality objects at locations in the physical presentation environment 102, such as the augmented reality object 106 at location 108. This dynamic interaction may use haptic feedback to indicate when the user 24 has reached and/or engaged the augmented reality objects 104 and/or placed the same at the desired locations (e.g., location 108). This may reduce or limit the amount of movement and/or energy expended by the user 24 in placing, orienting, and/or otherwise arranging augmented reality objects in the physical presentation environment 102.

Figure 8:
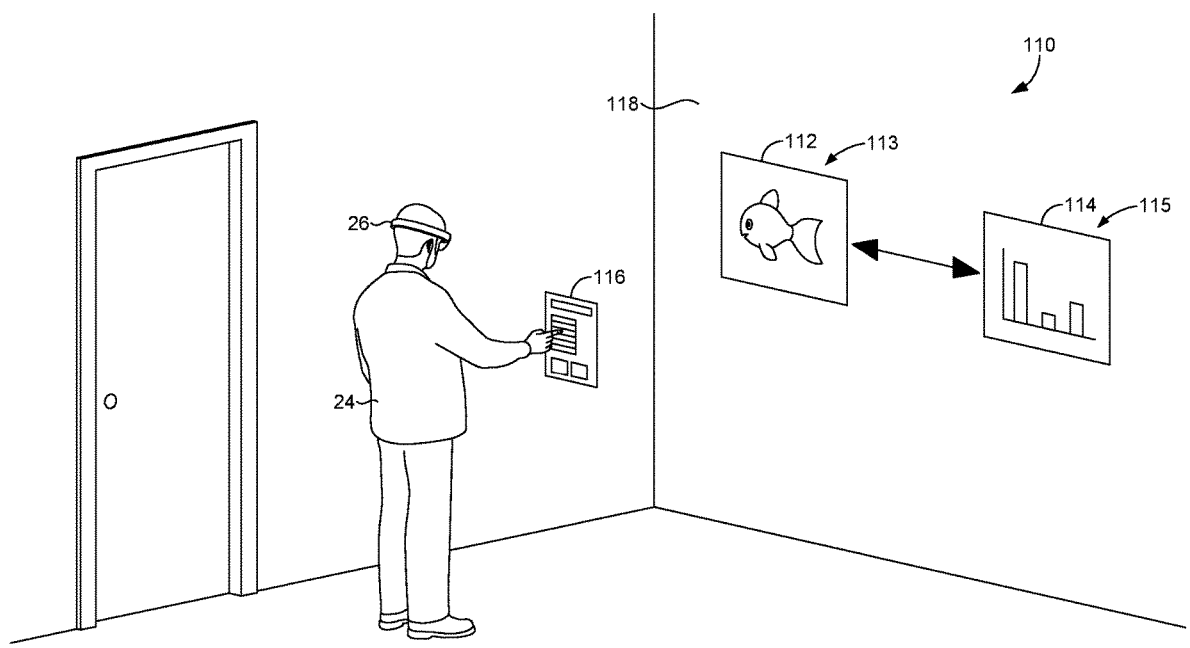
FIG. 8 depicts a user interaction with a dynamically interactive virtual control screen, in accordance with an embodiment of the present technology.

Referring to FIG. 8, a user interacting with a dynamically interactive virtual control screen 116 is provided, in accordance with an embodiment of the present technology. In FIG. 8, the user 24, using the head-mounted display 26, is viewing first and second augmented reality objects 112, 114 that are mapped and rendered to respective first and second locations 113, 115 in a physical presentation environment 110. The user 24 is interacting with the virtual control screen 116 to control the placement of the first and second augmented reality objects 112, 114, as well as their position relative to each other. More specifically, in the example provided in FIG. 8, the user 24 is dynamically interacting with the virtual control screen 116 to move the first and second augmented reality objects 112, 114 away from each other on a planar surface 118 of the physical presentation environment 110. Other manipulations of the first and second augmented reality objects 112, 114, including modification of their mapped location, or changes in their orientation, arrangement, and/or integration with each other, etc., are possible using the virtual control screen 116.

Figure 9:
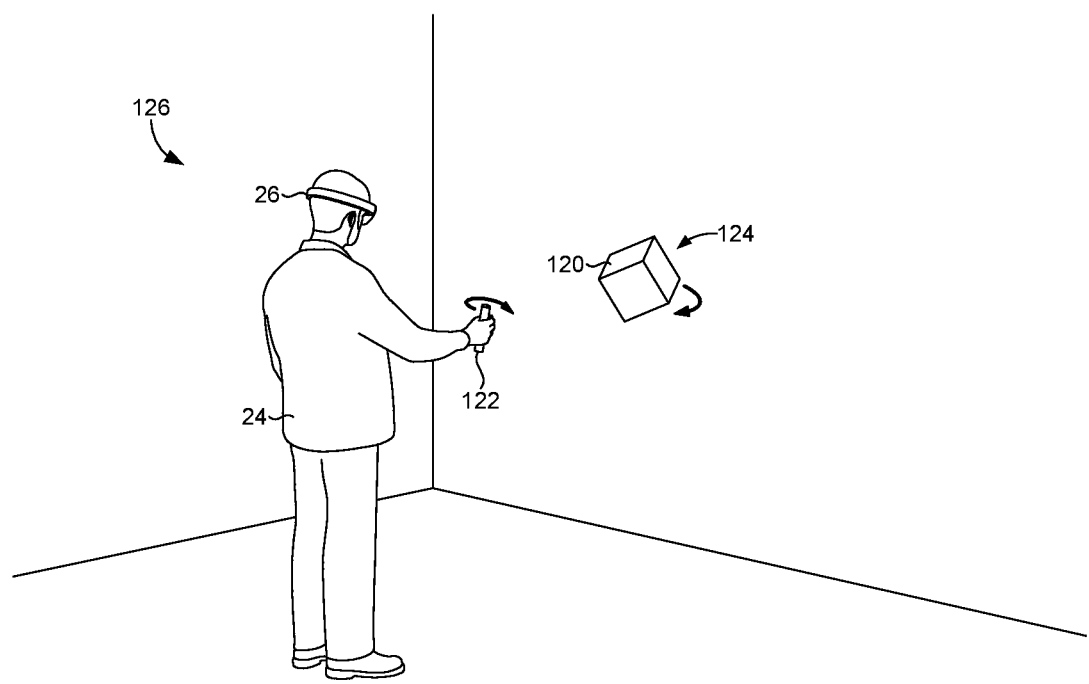
FIG. 9 depicts a user interacting with a physical object to control a dynamically interactive augmented reality object, in accordance with an embodiment of the present technology.

Referring to FIG. 9, a user interacting with a dynamically interactive augmented reality object 120 through manipulation of an associated physical object 122 is provided, in accordance with an embodiment of the present technology. In FIG. 9, the dynamically interactive augmented reality object 120 is mapped and rendered to a location 124 in a physical presentation environment 126. Furthermore, the dynamically interactive augmented reality object 120 has been associated with the physical object 122 (i.e., a pen), and as a result, the user 24 is able to manipulate the dynamically interactive augmented reality object 120 by manipulating the physical object 122 (e.g., by adjusting its orientation to change the corresponding orientation of the dynamically interactive augmented reality object 120).

In further embodiments, a user 24 may assign the physical object 122, or one or more other physical objects (e.g., a pen, mobile device, tablet, cup, etc.) to the dynamically interactive augmented reality object 120, allowing the user 24 to control characteristics of the dynamically interactive augmented reality object 120, such as its location, orientation, content, and/or display characteristics, through manipulation of the physical object 122. In this sense, the physical object 122 may be used as a proxy for the dynamically interactive augmented reality object 120. The user 24 may assign a physical object to an augmented reality object in any number of ways, such as using voice commands, touch-based dynamic input, gaze, and/or other user inputs.

Figure 10:
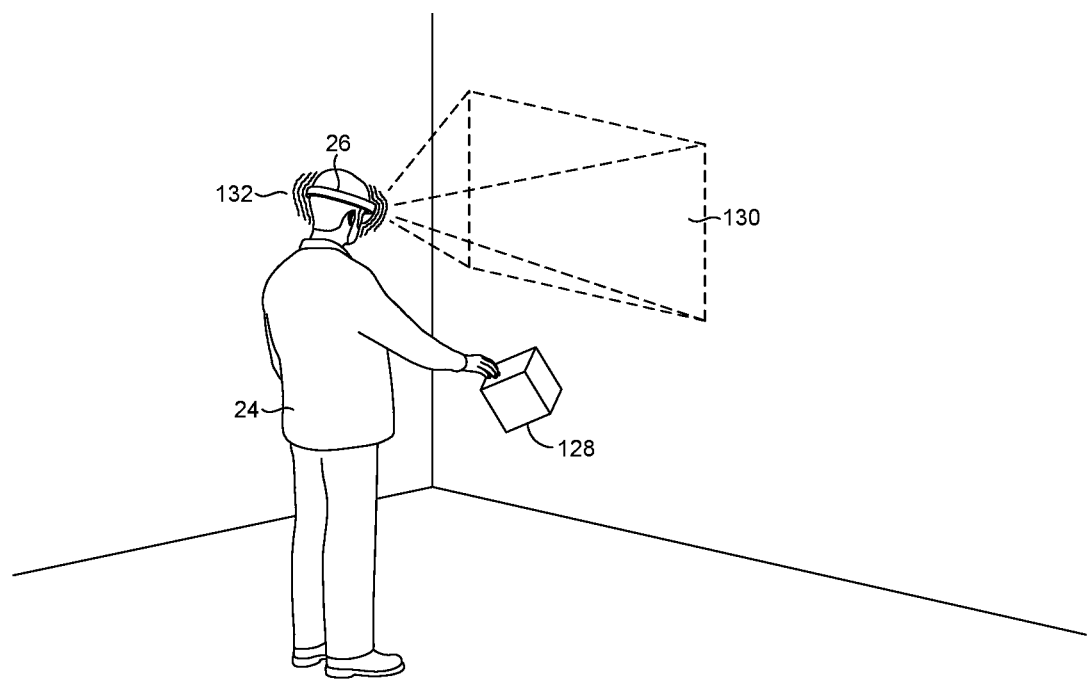
FIG. 10 depicts a user locating an augmented reality object outside of the user's field of view based on haptic feedback, in accordance with an embodiment of the present technology.

Referring to FIG. 10, a user interacting with an augmented reality object that is outside of the user's field of view based on haptic feedback is provided, in accordance with an embodiment of the present technology. Augmented reality objects mapped and rendered to locations of a physical presentation environment may at times move from the field of view of a user. For example, an augmented reality object may be rendered near a user, but when a user is looking away, it may be difficult for the user to determine where the augmented reality object is located, and also, if the augmented reality object has been engaged (e.g., touched or otherwise dynamically interacted with) by the user when the user is trying to find it without looking.

Accordingly, as shown in FIG. 10, the head-mounted display 26, or another augmented reality device used by the user 24, may be configured to provide haptic feedback to the user 24 to indicate when the user 24 has located (e.g., touched or engaged) a rendered augmented reality object 128 that is outside of his field of view 130. In this regard, haptic feedback 132 (e.g., vibration, noise, and/or visual indications provided by the head-mounted display 26 and/or additional devices) may be used to indicate when a desired interaction with rendered augmented reality objects, such as the augmented reality object 128 shown in FIG. 10, has been achieved.

Figure 11:
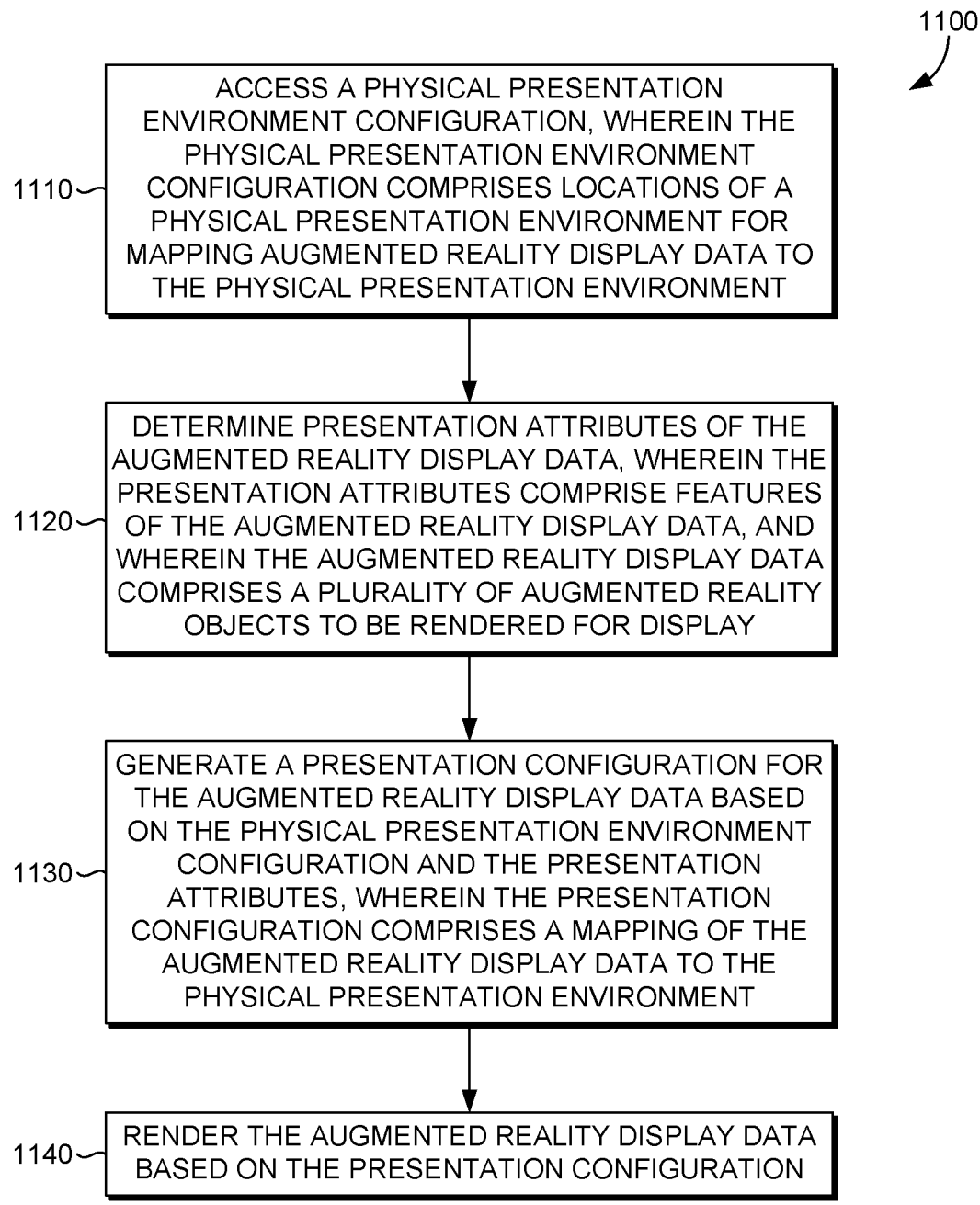
FIG. 11 depicts a block diagram of an exemplary method of rendering augmented reality display data based on a presentation configuration, in accordance with an embodiment of the present technology.

Referring to FIG. 11, a block diagram of an exemplary method 1100 of rendering augmented reality display data based on a physical presentation environment is provided, in accordance with an embodiment of the present technology. At block 1110, a physical presentation environment configuration is accessed. The physical presentation environment configuration may include locations of a physical presentation environment (e.g., locations of a physical space) for mapping augmented reality display data (e.g., a plurality of augmented reality objects) to the physical presentation environment. At block 1120, presentation attributes of the augmented reality display data are determined. The presentation attributes may include features of the augmented reality display data, such as dimensions, desired orientations, content, dynamic interactivity, etc., of the augmented reality objects. At block 1130, a presentation configuration is generated for the augmented reality display data based on the physical presentation environment configuration and the presentation attributes. The presentation configuration may be a mapping of the augmented reality display data (e.g., each of the augmented reality objects) to the physical presentation environment. At block 1140, the augmented reality display data is rendered for display based on the presentation configuration.

Figure 12:
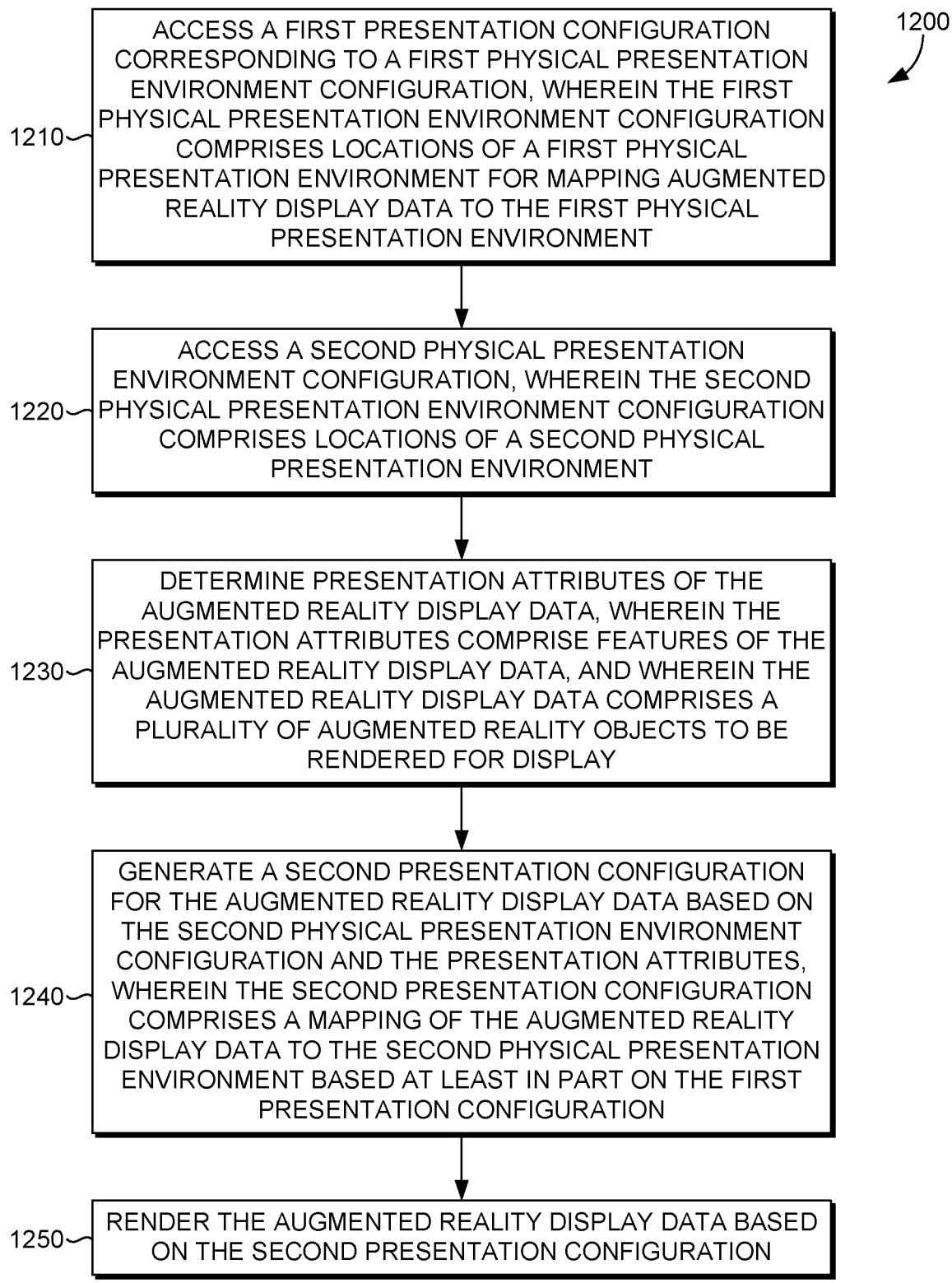
FIG. 12 depicts a block diagram of another exemplary method of rendering augmented reality display data based on a presentation configuration, in accordance with an embodiment of the present technology.

Referring to FIG. 12, a block diagram of an exemplary method 1200 of rendering augmented reality display data based on a presentation configuration is provided, in accordance with an embodiment of the present technology. At block 1210, a first presentation configuration corresponding to a first physical presentation environment configuration is accessed. A physical presentation environment configuration comprises locations of a physical presentation environment (e.g., locations of a physical space) for mapping augmented reality display data (e.g., a plurality of augmented reality objects) to a physical presentation environment. At block 1220, a second physical presentation environment configuration is accessed. The second physical presentation environment configuration comprises locations of a second physical presentation environment, such as for mapping the augmented reality display data. At block 1230, presentation attributes of the augmented reality display data are determined. The augmented reality display data may comprise a plurality of augmented reality objects. The presentation attributes may comprise features of the augmented reality display data, such as dimensions, preferred orientations, content, dynamic interactivity, etc., of the augmented reality objects. At block 1240, a second presentation configuration for the augmented reality display data is generated based on the second physical presentation environment configuration and the presentation attributes. The second presentation configuration comprises a mapping of the augmented reality display data to the second physical presentation environment based at least in part on the first presentation configuration. At block 1250, the augmented reality display data is rendered based on the second presentation configuration.

Figure 13:
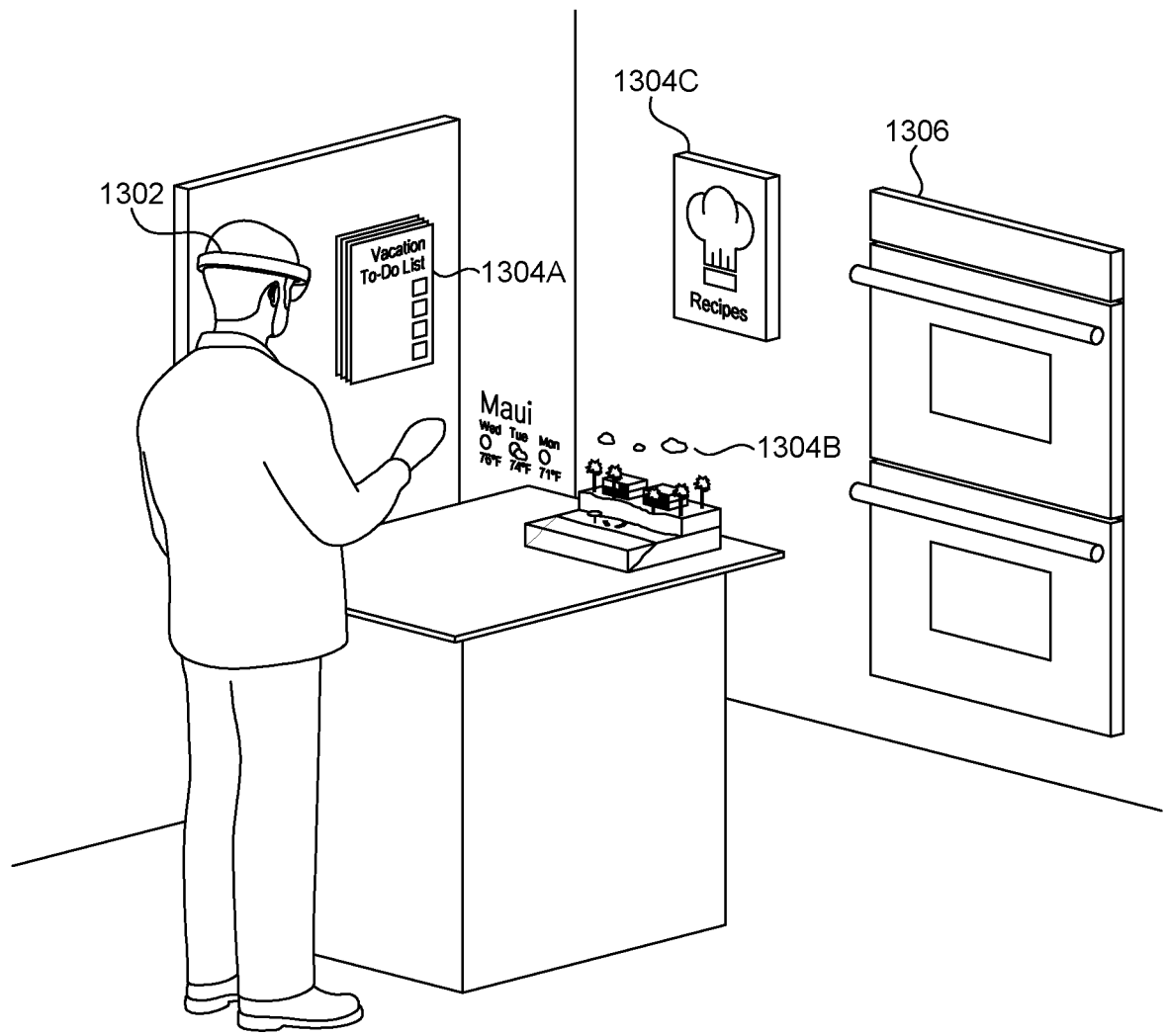
FIG. 13 is a schematic diagram showing exemplary augmented reality images of a head-mounted display device, in accordance with embodiments of the present technology.

Referring to FIG. 13, exemplary images of a head-mounted display (HMD) device 1302 are depicted. Augmented reality images (e.g., 1304A, 1304B, and 1304C), provided by the HMD device 1302, generally appear superimposed on a background and may appear to interact with or be integral with the background 1306. The background 1306 is comprised of a real-world scene, e.g., a scene that a user would perceive without augmented reality images emitted by the HMD device 1302. For example, the recipe book icon 1304C can appear superimposed and hanging in mid-air in front of the cooking oven or wall of the background 1306.

Figure 14:
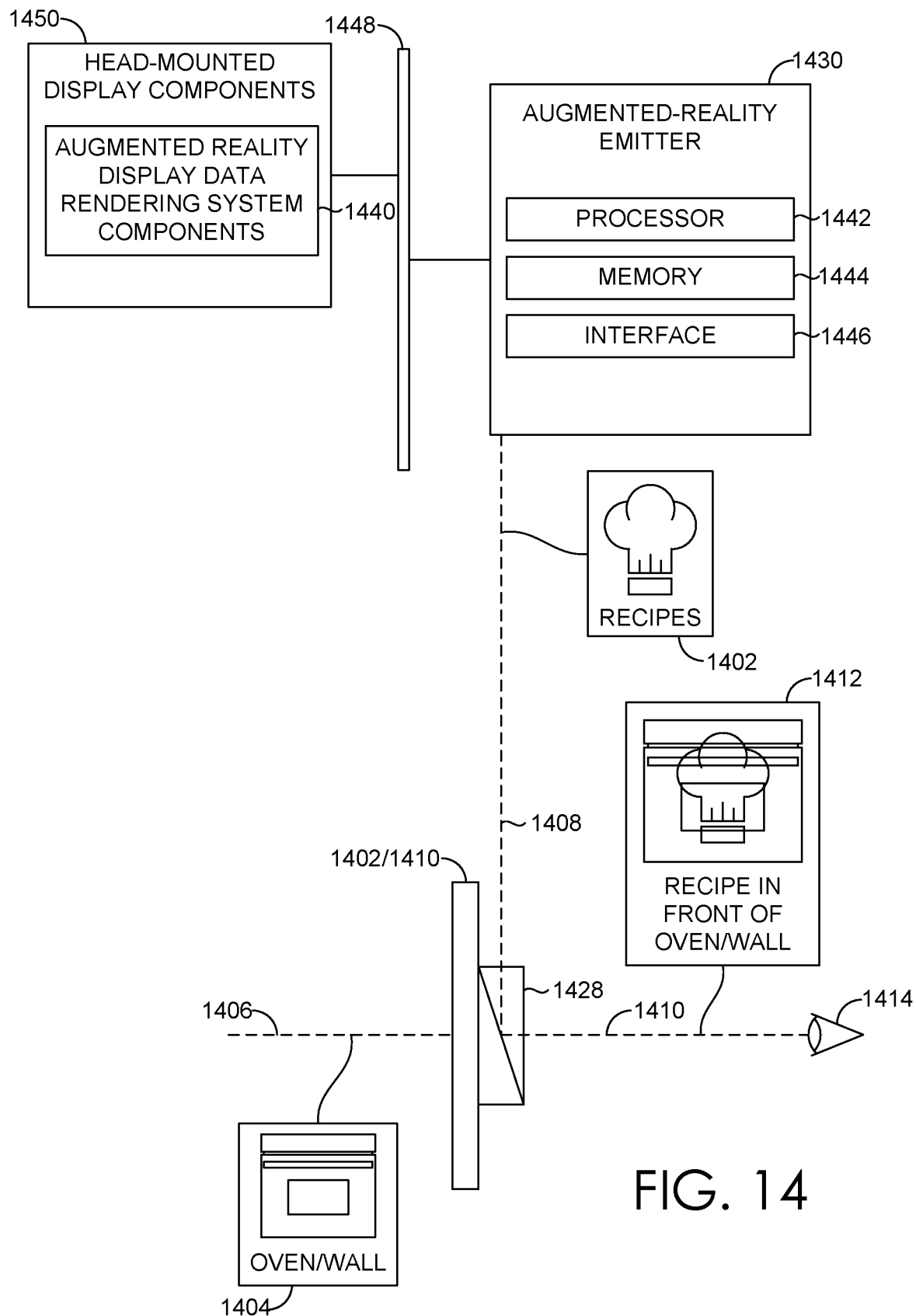
FIG. 14 is a block diagram of an exemplary head-mounted display device, in accordance with embodiments of the present technology.

Referring to FIG. 14, the HMD device 1402 having the augmented reality display data rendering system components 1440 is described in accordance with an embodiment described herein. The HMD device 1402 includes a see-through lens 1410 which is placed in front of a user's eye 1414, similar to an eyeglass lens. It is contemplated that a pair of see-through lenses 1410 can be provided, one for each eye 1414. The lens 1410 includes an optical display component 1428, such as a beam splitter (e.g., a half-silvered mirror). The HMD device 1402 includes an augmented reality emitter 1430 that facilitates the projecting or rendering of augmented reality images. Amongst other components not shown, the HMD device 1402 also includes a processor 1442, memory 1444, interface 1446, a bus 1448, and additional HMD components 1450. The augmented reality emitter 1430 emits light representing an augmented reality image 1402 exemplified by a light ray 1408. Light from the real-world scene 1404, such as a light ray 1406, reaches the lens 1410. Additional optics can be used to refocus the augmented reality image 1402 so that it appears to originate from several feet away from the eye 1414 rather than one inch away, where the display component 1428 may actually be. The memory 1444 can contain instructions which are executed by the processor 1442 to enable the augmented reality emitter 1430 to perform functions as described. One or more of the processors can be considered to be control circuits. The augmented reality emitter communicates with the additional HMD components 1450 using the bus 1448 and other suitable communication paths.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The augmented reality image 1402 is reflected by the display component 1428 toward a user's eye, as exemplified by a light ray 1410, so that the user sees an image 1412. In the image 1412, a portion of the real-world scene 1404, such as a cooking oven, is visible along with the entire augmented reality image 1402, such as a recipe book icon. The user can therefore see a mixed-reality image 1412 in which the recipe book icon is hanging in front of the cooking oven in this example.

Figure 15:
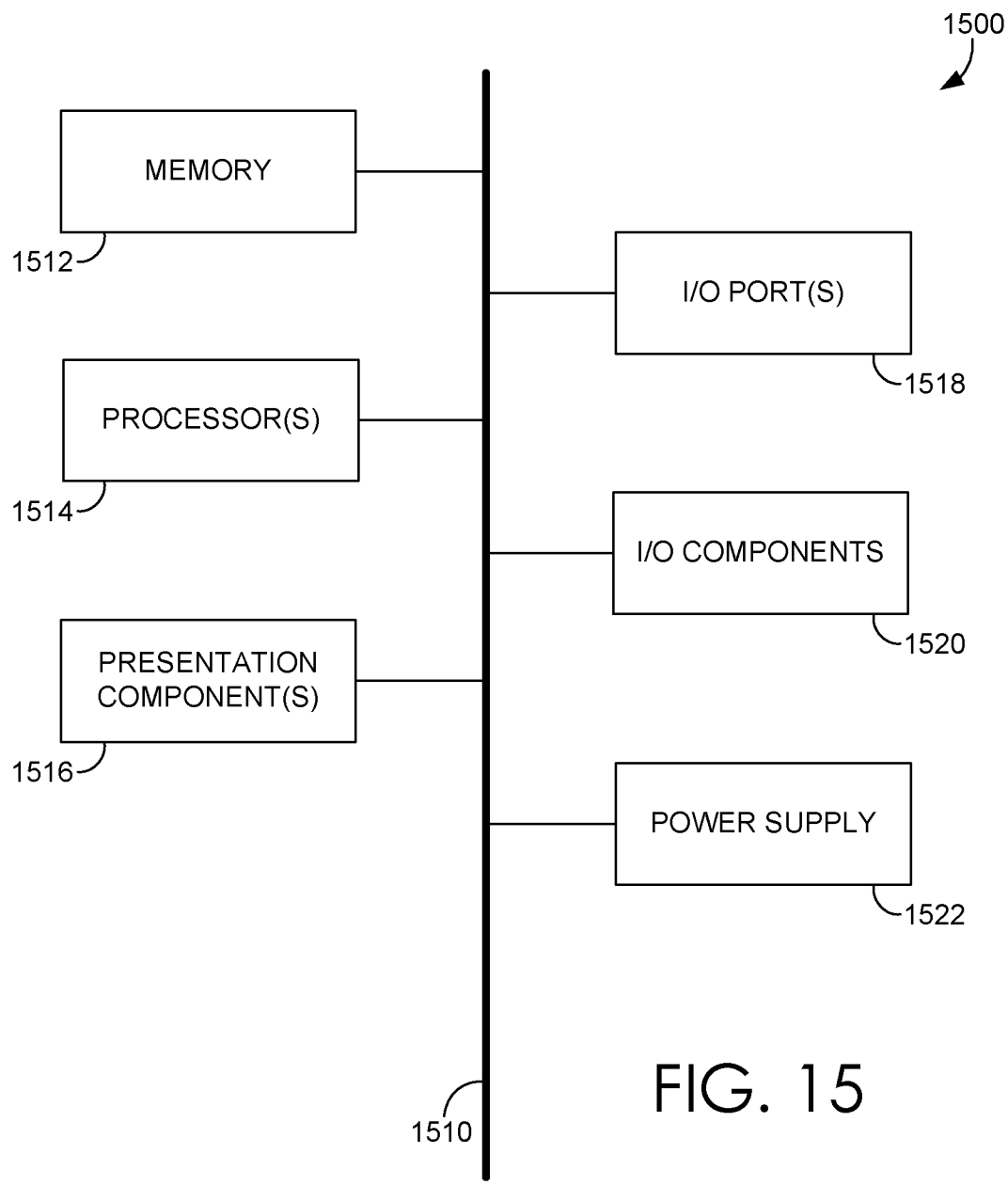
FIG. 15 depicts a block diagram of an exemplary computing environment suitable for implementing embodiments of the present technology.

Having described embodiments of the present technology, an exemplary operating environment in which embodiments of the present technology may be implemented is described below in order to provide a general context for various aspects of the present technology. Referring to FIG. 15 in particular, an exemplary operating environment for implementing embodiments of the present technology is shown and designated generally as computing device 1500. Computing device 1500 is but one example of a suitable computing environment and is not intended to suggest any limitation as to the scope of use or functionality of the technology. Neither should the computing device 1500 be interpreted as having any dependency or requirement relating to any one nor the combination of components illustrated.

The technology may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technology may be practiced in a variety of system configurations, including hand-held devices, consumer electronics, general-purpose computers, specialty computing devices, etc. The technology may also be practiced in distributed computing environments where tasks are performed by remote-processing devices that are linked through a communications network.

As shown in FIG. 15, computing device 1500 includes a bus 1510 that directly or indirectly couples the following devices: memory 1512, one or more processors 1514, one or more presentation components 1516, input/output ports 1518, input/output components 1520, and an illustrative power supply 1522. Bus 1510 represents what may be one or more busses (such as an address bus, data bus, or combination thereof). Although the various blocks of FIG. 15 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 15 is merely illustrative of an exemplary computing device that can be used in connection with one or more embodiments of the present technology. Distinction is not made between such categories as "workstation," "server," "laptop," "handheld device," etc., as all are contemplated as within the scope of FIG. 15 and reference to a "computing device."

Computing device 1500 typically includes a variety of computer-readable media. Computer-readable media can be any available media that can be accessed by computing device 1500 and includes volatile media, non-volatile media, removable media, and non-removable media. By way of example, and not limitation, computer-readable media may comprise computer storage media and/or communication media.

Computer storage media may include volatile, non-volatile, removable, and non-removable media implemented in any method or technology for storage of information, such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1500. Computer storage media excludes signals per se.

Communications media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communications media includes wired media such as a wired network or direct-wired connection, and wireless media such as acoustic, RF, infrared, and other wireless media. Combinations of any of the above should also be included within the scope of computer-readable media.

Memory 1512 includes computer storage media in the form of volatile and/or non-volatile memory. The memory may be removable, non-removable, or a combination thereof. Exemplary hardware devices include solid-state memory, hard drives, optical-disc drives, etc. Computing device 1500 includes one or more processors that read data from various entities such as memory 1512 or I/O components 1520. Presentation component(s) 1516 present data indications to a user or other device. Exemplary presentation components include a display device, speaker, printing component, vibrating component, etc.

I/O ports 1518 allow computing device 1500 to be logically coupled to other devices including I/O components 1520, some of which may be built in/integrated. Illustrative components include a microphone, joystick, game pad, satellite dish, scanner, printer, wireless device, etc.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps, similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described and required.

For the purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For the purposes of the detailed discussion above, embodiments of the present technology are described with reference to a head-mounted display device as an augmented reality device. However, the head-mounted display device depicted herein is merely exemplary. Components can be configured for performing novel aspects of embodiments, where configured for comprises programmed to perform particular tasks or implement particular abstract data types using code. Further, while embodiments of the present technology may generally refer to the head-mounted display device and the schematics described herein, it is understood that the techniques described may be extended to other implementation contexts.

Embodiments of the present technology have been described in relation to particular embodiments which are intended in all respects to be illustrative rather than restrictive. Alternative embodiments will become apparent to those of ordinary skill in the art to which the present technology pertains without departing from its scope.

From the foregoing, it will be seen that this technology is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A system for rendering augmented reality display data based on physical presentation environments, the system comprising:
    a presentation environment configuration component configured to:
    access a physical presentation environment configuration, wherein the physical presentation environment configuration comprises locations of a physical presentation environment for mapping augmented reality display data to the physical presentation environment;
    an augmented reality display data attribute component configured to:
    determine presentation attributes of the augmented reality display data, wherein the presentation attributes comprise features of the augmented reality display data, and wherein the augmented reality display data comprises a plurality of augmented reality objects to be rendered for display,
    determine the features of the presentation attributes based on at least one of: a retrieved data property identifying the features; and a retrieved layout property of the features;
    a data mapping component configured to:
    generate a presentation configuration for the augmented reality display data based on the physical presentation environment configuration and the presentation attributes, wherein the presentation configuration comprises a mapping of the augmented reality display data to the physical presentation environment; and
    a data rendering component configured to:
    render the augmented reality display data based on the presentation configuration.

2. The system of claim 1, further comprising a physical environment scanning component configured to:
    generate a scanned image of the physical presentation environment, and
    automatically perform a location recognition operation on the scanned image to determine the locations of the physical presentation environment for mapping the augmented reality display data.

3. The system of claim 2, wherein the location recognition operation determines the locations of the physical presentation environment based on one or more location mapping factors, the one or more location mapping factors comprising at least one of:
    a location of one or more planar surfaces in the physical presentation environment for mapping one or more of the plurality of augmented reality objects;
    a location of one or more objects in the physical presentation environment for mapping one or more of the plurality of augmented reality objects;
    a location of one or more avoidance areas in the physical presentation environment for restricting the mapping of one or more of the plurality of augmented reality objects; and
    a location of a user in the physical presentation environment.

4. The system of claim 1, wherein the presentation configuration is generated based on a previously generated presentation configuration for a different physical presentation environment in order to maintain at least one mapping characteristic of the previously generated presentation configuration, and wherein the previously generated presentation configuration is generated based on the different physical presentation environment configuration and the presentation attributes of the augmented reality display data.

5. The system of claim 1, wherein the data mapping component is further configured to generate the presentation configuration based on at least one of:
    a previously generated presentation configuration for the physical presentation environment; and
    a previously generated presentation configuration for a different physical presentation environment.

6. The system of claim 1, wherein the data mapping component is further configured to generate a modified presentation configuration for the augmented reality display data based on a received input indicating at least one of:
    a mapping preference for the augmented reality display data; and
    a mapping limitation for the augmented reality display data.

7. The system of claim 1, further comprising a virtual control screen generation component configured to generate a virtual control screen for mapping to the physical presentation environment with the augmented reality display data, wherein the virtual control screen is configured to modify the presentation configuration and the rendering of the augmented reality display data in response to dynamic interaction with the virtual control screen.

8. The system of claim 1, wherein rendering the augmented reality display data based on the presentation configuration comprises rendering each of the plurality of augmented reality objects to a respective one of the locations of the physical presentation environment.

9. The system of claim 1, wherein rendering the augmented reality display data comprises rendering at least one of the plurality of augmented reality objects to an object in the physical presentation environment, and wherein the at least one augmented reality object rendered to the object in the physical presentation environment is modifiable based on dynamic interaction with the object.

10. A computer-implemented method for rendering augmented reality display data based on physical presentation environments, the method comprising:
accessing a physical presentation environment configuration, wherein the physical presentation environment configuration comprises locations of a physical presentation environment for mapping augmented reality display data to the physical presentation environment;
determining presentation attributes of the augmented reality display data, wherein the presentation attributes comprise features of the augmented reality display data, and wherein the augmented reality display data comprises a plurality of augmented reality objects to be rendered for display;
generating a presentation configuration for the augmented reality display data based on the physical presentation environment configuration and the presentation attributes, wherein generating the presentation configuration is based on at least one of: a previously generated presentation configuration for the physical presentation environment; and a previously generated presentation configuration for a different physical presentation environment, wherein the presentation configuration comprises a mapping of the augmented reality display data to the physical presentation environment; and
rendering the augmented reality display data based on the presentation configuration.

11. The computer-implemented method of claim 10, wherein the presentation configuration is generated based on the previously generated presentation configuration for the different physical presentation environment in order to maintain at least one mapping characteristic of the previously generated presentation configuration, and wherein the previously generated presentation configuration is generated based on the different physical presentation environment configuration and the presentation attributes of the augmented reality display data.

12. The computer-implemented method of claim 10, wherein the presentation configuration is generated based on a previously generated presentation configuration for the physical presentation environment, wherein the presentation configuration at least one of:
maintains a mapping characteristic of the previously generated presentation configuration,
maintains a received mapping preference for the previously generated presentation configuration,
maintains a received mapping limitation for the previously generated presentation configuration, and
modifies a mapping characteristic of the previously generated presentation configuration.

13. The computer-implemented method of claim 10, wherein accessing a physical presentation environment configuration comprises:
receiving a scanned image of the physical presentation environment that includes the locations;
performing a location recognition operation on the scanned image to determine the locations based on one or more location mapping factors, the one or more location mapping factors comprising at least one of:
a location of one or more planar surfaces in the physical presentation environment for mapping one or more of the plurality of augmented reality objects;
a location of one or more objects in the physical presentation environment for mapping one or more of the plurality of augmented reality objects;
a location of one or more avoidance areas in the physical presentation environment for restricting the mapping of one or more of the plurality of augmented reality objects; and
a location of a user in the physical presentation environment.

14. The computer-implemented method of claim 10, further comprising:
receiving an input for the mapping of the augmented reality display data, the input comprising at least one of:
a mapping preference, and
a mapping limitation;
generating a modified presentation configuration for the augmented reality display data based on the received input; and
rendering the augmented reality display data based on the modified presentation configuration.

15. One or more computer storage media having computer-executable instructions embodied thereon that, when executed by one or more processors, cause the one or more processors to perform a method for rendering augmented reality display data based on physical presentation environments, the method comprising:
accessing a first presentation configuration corresponding to a first physical presentation environment configuration, wherein a physical presentation environment configuration comprises locations of a physical presentation environment for mapping augmented reality display data to a physical presentation environment;
accessing a second physical presentation environment configuration, wherein the second physical presentation environment configuration comprises locations of a second physical presentation environment;
determining presentation attributes of the augmented reality display data, wherein the presentation attributes comprise features of the augmented reality display data, and wherein the augmented reality display data comprises a plurality of augmented reality objects to be rendered for display;
determining the features of the presentation attributes based on at least one of: a retrieved data property identifying the features; and a retrieved layout property of the features;
generating a second presentation configuration for the augmented reality display data based on the second physical presentation environment configuration and the presentation attributes, wherein the second presentation configuration comprises a mapping of the augmented reality display data to the second physical presentation environment based at least in part on the first presentation configuration; and rendering the augmented reality display data based on the second presentation configuration.

16. The one or more computer storage media of claim 15, wherein the rendered augmented reality display data includes a dynamically interactive augmented reality object, and wherein the rendered augmented reality display data is modifiable based on dynamic interaction with at least one of:
the dynamically interactive augmented reality object; and
an object in the physical presentation environment associated with the dynamically interactive augmented reality object.

17. The one or more computer storage media of claim 16, wherein the method further comprises:
receiving a dynamic input that modifies the dynamically interactive augmented reality object, wherein the dynamic input initiates at least one of:
a change in location of the dynamically interactive augmented reality object,
a change in orientation of the dynamically interactive augmented reality object,
a change in orientation of the dynamically interactive augmented reality object,
a modification of content presented with the dynamically interactive augmented reality object,
a reorganization of content presented with the dynamically interactive augmented reality object, and
a modification of at least some of the rendered augmented reality display data; and modifying the rendered augmented reality display data based on the received dynamic input.

18. The one or more computer storage media of claim 16, wherein the dynamically interactive augmented reality object is rendered to remain at a fixed location and orientation relative to a user.

19. The one or more computer storage media of claim 16, wherein the dynamic interaction comprises at least one of:
a detected user eye movement guiding the dynamic interaction with the dynamically interactive augmented reality object;
a detected user body movement guiding the dynamic interaction with the dynamically interactive augmented reality object;
a detected input from an additional input device;
an assignment of the dynamically interactive augmented reality object to a location in the physical presentation environment; and
an assignment of one or more of the plurality of augmented reality objects to one or more of the locations in the physical presentation environment configuration based on at least one of:
dynamic placement of the plurality of augmented reality objects on the dynamically interactive augmented reality object, and
dynamic placement of the plurality of augmented reality objects on the physical presentation environment.

20. The one or more computer storage media of claim 16, wherein the dynamic interaction provides a haptic feedback.

* * * * *